(12) United States Patent
Brezina et al.

(10) Patent No.: US 9,591,086 B2
(45) Date of Patent: *Mar. 7, 2017

(54) DISPLAY OF INFORMATION IN ELECTRONIC COMMUNICATIONS

(75) Inventors: Matthew Brezina, San Francisco, CA (US); Adam Smith, San Francisco, CA (US)

(73) Assignee: YAHOO! INC., Sunnyvale, CA (US)

(*) Notice: Subject to any disclaimer, the term of this patent is extended or adjusted under 35 U.S.C. 154(b) by 687 days.

This patent is subject to a terminal disclaimer.

(21) Appl. No.: 12/180,498

(22) Filed: Jul. 25, 2008

(65) Prior Publication Data

US 2009/0030933 A1    Jan. 29, 2009

Related U.S. Application Data

(60) Provisional application No. 60/951,880, filed on Jul. 25, 2007.

(51) Int. Cl.
*G06F 17/30* (2006.01)
*H04L 29/08* (2006.01)
(Continued)

(52) U.S. Cl.
CPC .......... *H04L 67/22* (2013.01); *G06F 3/04842* (2013.01); *G06F 17/2247* (2013.01); *G06F 17/30554* (2013.01); *G06F 17/30722* (2013.01); *G06F 17/30905* (2013.01); *H04L 51/046* (2013.01); *H04L 51/16* (2013.01); *H04L 51/36* (2013.01); *H04L 67/306* (2013.01);
(Continued)

(58) Field of Classification Search
CPC .............................. H04L 67/24; H04L 67/306

USPC .......................... 707/783, 784; 709/726, 207
See application file for complete search history.

(56) References Cited

U.S. PATENT DOCUMENTS 5,396,647 A    3/1995 Thompson et al.
5,610,915 A    3/1997 Elliott et al.
(Continued)

FOREIGN PATENT DOCUMENTS

CN    101351818    1/2009
CN    1013518118   1/2009
(Continued)

OTHER PUBLICATIONS

Android-Tips.com, "Android Tips & Tricks: How to Import Contacts into Android Phone," located at http://android-tips.com/how-to-import-contacts-into-android/, Nov. 17, 2008 (document provided includes third-party comments submitted under the USPTO PeerToPatent program).

(Continued)

*Primary Examiner* — Baoquoc N To
(74) *Attorney, Agent, or Firm* — James J. DeCarlo; Greenberg Traurig LLP

(57) ABSTRACT

Among other disclosures, a method may include collecting historical communication data and personal data relating to a portion of a plurality of communications, a sender of one or more of the communications or one or more recipients of the communications. The method may include depositing the collected data into a repository of historical communication data and personal data. The method may include customizing an electronic communication based on one or more items in the repository, in response to user behavior.

14 Claims, 7 Drawing Sheets

(51) Int. Cl.
*H04M 15/00* (2006.01)
*H04W 24/08* (2009.01)
*G06F 17/22* (2006.01)
*G06F 3/0484* (2013.01)
*H04L 12/58* (2006.01)

(52) U.S. Cl.
CPC ........... *H04M 15/00* (2013.01); *H04M 15/43* (2013.01); *H04M 15/44* (2013.01); *H04M 15/58* (2013.01); *H04M 15/745* (2013.01); *H04W 24/08* (2013.01); *H04M 2215/0104* (2013.01); *H04M 2215/0108* (2013.01); *H04M 2215/0188* (2013.01)

(56) References Cited

U.S. PATENT DOCUMENTS

| | | | |
|---|---|---|---|
| 5,966,714 | A | 10/1999 | Huang et al. |
| 6,020,884 | A | 2/2000 | MacNaughton et al. |
| 6,154,205 | A | 11/2000 | Carroll et al. |
| 6,285,999 | B1 | 9/2001 | Page |
| 6,321,187 | B1 | 11/2001 | Squier et al. |
| 6,385,644 | B1 | 5/2002 | Devine et al. |
| 6,405,197 | B2 | 6/2002 | Gilmour |
| 6,484,196 | B1 | 11/2002 | Maurille |
| 6,502,131 | B1 | 12/2002 | Vaid et al. |
| 6,510,453 | B1 * | 1/2003 | Apfel et al. ............... 709/206 |
| 6,546,393 | B1 | 4/2003 | Khan |
| 6,560,620 | B1 | 5/2003 | Ching |
| 6,594,654 | B1 | 7/2003 | Salam et al. |
| 6,606,744 | B1 | 8/2003 | Mikurak |
| 6,615,348 | B1 | 9/2003 | Gibbs |
| 6,721,748 | B1 | 4/2004 | Knight et al. |
| 6,931,419 | B1 * | 8/2005 | Lindquist ............... 707/792 |
| 6,952,805 | B1 | 10/2005 | Tafoya et al. |
| 6,965,918 | B1 | 11/2005 | Arnold et al. |
| 6,996,777 | B2 | 2/2006 | Hiipakka |
| 7,003,724 | B2 | 2/2006 | Newman |
| 7,058,892 | B1 | 6/2006 | MacNaughton et al. |
| 7,076,533 | B1 | 7/2006 | Knox et al. |
| 7,085,745 | B2 | 8/2006 | Klug |
| 7,103,806 | B1 | 9/2006 | Horvitz |
| 7,149,985 | B1 | 12/2006 | Crosby et al. |
| 7,181,518 | B1 | 2/2007 | Matsumoto et al. |
| 7,185,065 | B1 | 2/2007 | Holtzman et al. |
| 7,237,009 | B1 | 6/2007 | Fung et al. |
| 7,246,045 | B1 * | 7/2007 | Rappaport et al. ............ 703/2 |
| 7,289,614 | B1 | 10/2007 | Twerdahl et al. |
| 7,328,242 | B1 | 2/2008 | McCarthy et al. |
| 7,333,976 | B1 | 2/2008 | Auerbach et al. |
| 7,359,894 | B1 | 4/2008 | Liebman et al. |
| 7,383,307 | B2 | 6/2008 | Kirkland et al. |
| 7,444,323 | B2 | 10/2008 | Martinez et al. |
| 7,454,464 | B2 | 11/2008 | Puthenkulam et al. |
| 7,475,109 | B1 * | 1/2009 | Fletcher ............... G06Q 10/107 709/204 |
| 7,475,113 | B2 | 1/2009 | Stolze |
| 7,478,361 | B2 | 1/2009 | Peteanu et al. |
| 7,512,788 | B2 | 3/2009 | Choi et al. |
| 7,512,814 | B2 | 3/2009 | Chen et al. |
| 7,536,384 | B2 | 5/2009 | Venkataraman et al. |
| 7,539,676 | B2 | 5/2009 | Aravamudan et al. |
| 7,580,363 | B2 | 8/2009 | Sorvari et al. |
| 7,593,995 | B1 | 9/2009 | He et al. |
| 7,606,860 | B2 | 10/2009 | Puthenkulam et al. |
| 7,610,341 | B2 | 10/2009 | Daniell |
| 7,620,407 | B1 | 11/2009 | Donald et al. |
| 7,624,103 | B2 | 11/2009 | Wiegering et al. |
| 7,627,598 | B1 | 12/2009 | Burke |
| 7,634,463 | B1 | 12/2009 | Katragadda et al. |
| 7,639,157 | B1 | 12/2009 | Whitley et al. |
| 7,653,695 | B2 | 1/2010 | Flury et al. |
| 7,685,144 | B1 | 3/2010 | Katragadda |
| 7,692,653 | B1 | 4/2010 | Petro et al. |
| 7,698,140 | B2 | 4/2010 | Bhardwaj et al. |
| 7,702,730 | B2 | 4/2010 | Spataro et al. |
| 7,707,249 | B2 | 4/2010 | Spataro et al. |
| 7,707,509 | B2 * | 4/2010 | Naono et al. ............... 715/764 |
| 7,716,140 | B1 | 5/2010 | Nielsen et al. |
| 7,720,916 | B2 | 5/2010 | Fisher et al. |
| 7,724,878 | B2 | 5/2010 | Timmins et al. |
| 7,725,492 | B2 | 5/2010 | Sittig |
| 7,730,010 | B2 | 6/2010 | Kishore et al. |
| 7,743,051 | B1 | 6/2010 | Kashyap et al. |
| 7,752,081 | B2 | 7/2010 | Calabria |
| 7,756,895 | B1 | 7/2010 | Emigh |
| 7,756,935 | B2 | 7/2010 | Gaucas |
| 7,761,436 | B2 | 7/2010 | Norton et al. |
| 7,788,260 | B2 | 8/2010 | Lunt |
| 7,805,492 | B1 | 9/2010 | Thatcher |
| 7,818,396 | B2 | 10/2010 | Dolin et al. |
| 7,827,208 | B2 | 11/2010 | Bosworth |
| 7,827,265 | B2 | 11/2010 | Cheever et al. |
| 7,831,676 | B1 | 11/2010 | Nagar |
| 7,831,692 | B2 | 11/2010 | French et al. |
| 7,836,045 | B2 | 11/2010 | Schachter |
| 7,836,132 | B2 | 11/2010 | Qureshi et al. |
| 7,836,134 | B2 | 11/2010 | Pantalone |
| 7,849,141 | B1 * | 12/2010 | Bellegarda et al. .......... 709/206 |
| 7,849,142 | B2 | 12/2010 | Clegg et al. |
| 7,853,602 | B2 | 12/2010 | Gorti et al. |
| 7,853,881 | B1 | 12/2010 | Aly Assal et al. |
| 7,865,562 | B2 | 1/2011 | Nesbitt et al. |
| 7,870,197 | B2 | 1/2011 | Lewis et al. |
| 7,899,806 | B2 | 3/2011 | Aravamudan et al. |
| 7,899,871 | B1 | 3/2011 | Kumar et al. |
| 7,908,647 | B1 * | 3/2011 | Polis et al. ............... 726/5 |
| 7,925,690 | B2 | 4/2011 | Smith et al. |
| 7,930,430 | B2 | 4/2011 | Thatcher et al. |
| 7,949,611 | B1 | 5/2011 | Nielsen et al. |
| 7,949,627 | B2 | 5/2011 | Aravamudan et al. |
| 7,970,832 | B2 | 6/2011 | Perry et al. |
| 7,979,569 | B2 | 7/2011 | Eisner et al. |
| 7,991,764 | B2 * | 8/2011 | Rathod ............... 707/713 |
| 7,996,456 | B2 * | 8/2011 | Gross ............... 709/200 |
| 8,005,806 | B2 | 8/2011 | Rupp et al. |
| 8,028,032 | B2 | 9/2011 | Laird-McConnell |
| 8,055,715 | B2 | 11/2011 | Bensky et al. |
| 8,073,928 | B2 | 12/2011 | Dolin et al. |
| 8,086,676 | B2 | 12/2011 | Palahnuk et al. |
| 8,086,968 | B2 | 12/2011 | McCaffrey et al. |
| 8,140,566 | B2 | 3/2012 | Boerries et al. |
| 8,145,791 | B2 | 3/2012 | Thatcher et al. |
| 8,151,358 | B1 | 4/2012 | Herold |
| 8,161,122 | B2 | 4/2012 | Sood et al. |
| 8,200,761 | B1 | 6/2012 | Tevanian |
| 8,200,808 | B2 | 6/2012 | Ishida |
| 8,204,897 | B1 | 6/2012 | Djabarov et al. |
| 8,239,197 | B2 | 8/2012 | Webb et al. |
| 8,244,848 | B1 | 8/2012 | Narayanan et al. |
| 8,284,783 | B1 | 10/2012 | Maufer et al. |
| 8,291,019 | B1 | 10/2012 | Rochelle et al. |
| 8,296,179 | B1 | 10/2012 | Rennison |
| 8,316,315 | B2 | 11/2012 | Portnoy et al. |
| 8,363,803 | B2 | 1/2013 | Gupta |
| 8,365,235 | B2 | 1/2013 | Hunt et al. |
| 8,392,409 | B1 | 3/2013 | Kashyap et al. |
| 8,392,836 | B1 | 3/2013 | Bau et al. |
| 8,412,174 | B2 | 4/2013 | Khosravi |
| 8,423,545 | B2 | 4/2013 | Cort et al. |
| 8,433,762 | B1 | 4/2013 | Wald et al. |
| 8,443,441 | B2 | 5/2013 | Stolfo et al. |
| 8,463,872 | B2 | 6/2013 | Pounds et al. |
| 8,468,168 | B2 | 6/2013 | Brezina et al. |
| 8,495,045 | B2 | 7/2013 | Wolf et al. |
| 8,510,389 | B1 | 8/2013 | Gurajada et al. |
| 8,522,257 | B2 | 8/2013 | Rupp et al. |
| 8,549,412 | B2 | 10/2013 | Brezina et al. |
| 8,600,343 | B2 | 12/2013 | Brezina et al. |
| 8,606,335 | B2 | 12/2013 | Ozaki |
| 8,620,935 | B2 | 12/2013 | Rubin et al. |
| 8,661,002 | B2 | 2/2014 | Smith et al. |
| 8,666,035 | B2 | 3/2014 | Timmins et al. |
| 8,694,633 | B2 | 4/2014 | Mansfield et al. |

(56) References Cited

U.S. PATENT DOCUMENTS

| | | |
|---|---|---|
| 8,706,652 B2 | 4/2014 | Yang et al. |
| 8,717,933 B2 | 5/2014 | Fisher et al. |
| 8,745,060 B2 | 6/2014 | Brezina et al. |
| 8,754,848 B2 | 6/2014 | Holzer et al. |
| 8,793,625 B2 | 7/2014 | Rhee et al. |
| 8,819,234 B1 | 8/2014 | Bauer et al. |
| 8,849,816 B2 | 9/2014 | Burba et al. |
| 8,850,343 B2 | 9/2014 | Klassen et al. |
| 8,924,956 B2 | 12/2014 | Smith |
| 8,972,257 B2 | 3/2015 | Bonforte |
| 8,982,053 B2 | 3/2015 | Holzer et al. |
| 8,984,074 B2 | 3/2015 | Monaco |
| 8,990,323 B2 | 3/2015 | Hein et al. |
| 9,020,938 B2 | 4/2015 | Cort et al. |
| 9,058,366 B2 | 6/2015 | Brezina et al. |
| 9,087,323 B2 | 7/2015 | Hein et al. |
| 9,159,057 B2 | 10/2015 | Monaco |
| 9,195,753 B1 | 11/2015 | King et al. |
| 9,275,118 B2 | 3/2016 | Brezina et al. |
| 9,275,126 B2 | 3/2016 | Smith et al. |
| 9,298,783 B2 | 3/2016 | Brezina et al. |
| 2001/0022792 A1 | 9/2001 | Maeno et al. |
| 2001/0037407 A1 | 11/2001 | Dragulev et al. |
| 2001/0049628 A1* | 12/2001 | Icho .................. 705/14 |
| 2002/0007310 A1 | 1/2002 | Long |
| 2002/0016818 A1 | 2/2002 | Kirani et al. |
| 2002/0024536 A1 | 2/2002 | Kahan et al. |
| 2002/0049751 A1 | 4/2002 | Chen et al. |
| 2002/0054587 A1 | 5/2002 | Baker et al. |
| 2002/0059402 A1 | 5/2002 | Belanger |
| 2002/0059418 A1 | 5/2002 | Bird et al. |
| 2002/0059425 A1 | 5/2002 | Belfiore et al. |
| 2002/0073011 A1 | 6/2002 | Brattain et al. |
| 2002/0073058 A1 | 6/2002 | Kremer et al. |
| 2002/0076004 A1 | 6/2002 | Brockenbrough et al. |
| 2002/0078090 A1 | 6/2002 | Hwang et al. |
| 2002/0087647 A1 | 7/2002 | Quine et al. |
| 2002/0091777 A1* | 7/2002 | Schwartz .................. 709/206 |
| 2002/0103873 A1 | 8/2002 | Ramanathan et al. |
| 2002/0103879 A1 | 8/2002 | Mondragon |
| 2002/0107991 A1 | 8/2002 | Maguire et al. |
| 2002/0116396 A1 | 8/2002 | Somers et al. |
| 2002/0143871 A1 | 10/2002 | Meyer et al. |
| 2002/0152216 A1 | 10/2002 | Bouthors |
| 2002/0163539 A1 | 11/2002 | Srinivasan |
| 2002/0194502 A1 | 12/2002 | Sheth et al. |
| 2003/0028525 A1 | 2/2003 | Santos et al. |
| 2003/0037116 A1 | 2/2003 | Nolan et al. |
| 2003/0041030 A1 | 2/2003 | Mansfield |
| 2003/0093483 A1 | 5/2003 | Allen et al. |
| 2003/0114171 A1 | 6/2003 | Miyamoto |
| 2003/0114956 A1 | 6/2003 | Cullen et al. |
| 2003/0120608 A1* | 6/2003 | Pereyra .................. 705/64 |
| 2003/0131062 A1 | 7/2003 | Miyashita |
| 2003/0142125 A1 | 7/2003 | Salmimaa et al. |
| 2003/0167324 A1 | 9/2003 | Farnham et al. |
| 2003/0204439 A1 | 10/2003 | Cullen |
| 2003/0217106 A1 | 11/2003 | Adar et al. |
| 2003/0220835 A1 | 11/2003 | Barnes, Jr. |
| 2003/0220978 A1* | 11/2003 | Rhodes .................. 709/206 |
| 2003/0220989 A1 | 11/2003 | Tsuji et al. |
| 2003/0233419 A1 | 12/2003 | Beringer |
| 2004/0002903 A1 | 1/2004 | Stolfo et al. |
| 2004/0015547 A1 | 1/2004 | Griffin et al. |
| 2004/0015554 A1* | 1/2004 | Wilson .................. G06Q 10/107 709/206 |
| 2004/0034537 A1 | 2/2004 | Gengarella et al. |
| 2004/0039630 A1 | 2/2004 | Begole et al. |
| 2004/0056901 A1 | 3/2004 | March et al. |
| 2004/0068545 A1 | 4/2004 | Daniell et al. |
| 2004/0073616 A1* | 4/2004 | Fellenstein .......... G06Q 10/107 709/206 |
| 2004/0078443 A1* | 4/2004 | Malik .................. G06Q 10/107 709/206 |
| 2004/0078444 A1* | 4/2004 | Malik .................. G06Q 10/107 709/206 |
| 2004/0078445 A1* | 4/2004 | Malik .................. G06Q 10/107 709/206 |
| 2004/0100497 A1 | 5/2004 | Quillen et al. |
| 2004/0122904 A1 | 6/2004 | Kim |
| 2004/0128355 A1 | 7/2004 | Chao et al. |
| 2004/0128356 A1 | 7/2004 | Bernstein et al. |
| 2004/0133561 A1 | 7/2004 | Burke |
| 2004/0133809 A1 | 7/2004 | Dahl et al. |
| 2004/0153504 A1 | 8/2004 | Hutchinson et al. |
| 2004/0162878 A1 | 8/2004 | Lewis et al. |
| 2004/0174964 A1* | 9/2004 | Koch .................. H04M 3/53391 379/88.17 |
| 2004/0177048 A1 | 9/2004 | Klug |
| 2004/0186851 A1 | 9/2004 | Jhingan et al. |
| 2004/0202117 A1 | 10/2004 | Wilson et al. |
| 2004/0205002 A1 | 10/2004 | Layton |
| 2004/0210827 A1 | 10/2004 | Burg et al. |
| 2004/0215726 A1 | 10/2004 | Arning et al. |
| 2004/0215734 A1 | 10/2004 | Nagai et al. |
| 2004/0236749 A1 | 11/2004 | Cortright et al. |
| 2004/0260756 A1 | 12/2004 | Forstall et al. |
| 2004/0268229 A1 | 12/2004 | Paoli et al. |
| 2005/0015432 A1 | 1/2005 | Cohen |
| 2005/0027699 A1 | 2/2005 | Awadallah et al. |
| 2005/0027779 A1 | 2/2005 | Schinner |
| 2005/0038687 A1 | 2/2005 | Galdes |
| 2005/0044152 A1 | 2/2005 | Hardy et al. |
| 2005/0049896 A1 | 3/2005 | Giunta |
| 2005/0055409 A1 | 3/2005 | Alsarraf et al. |
| 2005/0055639 A1 | 3/2005 | Fogg |
| 2005/0060638 A1 | 3/2005 | Mathew et al. |
| 2005/0076090 A1* | 4/2005 | Thuerk .................. 709/207 |
| 2005/0076221 A1 | 4/2005 | Olkin et al. |
| 2005/0080868 A1* | 4/2005 | Malik .................. G06Q 10/10 709/207 |
| 2005/0090911 A1 | 4/2005 | Ingargiola et al. |
| 2005/0091272 A1 | 4/2005 | Smith et al. |
| 2005/0091314 A1 | 4/2005 | Blagsvedt et al. |
| 2005/0091401 A1 | 4/2005 | Keohane et al. |
| 2005/0102257 A1 | 5/2005 | Onyon et al. |
| 2005/0102361 A1 | 5/2005 | Winjum et al. |
| 2005/0108273 A1 | 5/2005 | Brebner |
| 2005/0131888 A1 | 6/2005 | Tafoya et al. |
| 2005/0138070 A1 | 6/2005 | Huberman et al. |
| 2005/0138631 A1 | 6/2005 | Bellotti et al. |
| 2005/0140653 A1 | 6/2005 | Pletikosa et al. |
| 2005/0149620 A1 | 7/2005 | Kirkland et al. |
| 2005/0159970 A1 | 7/2005 | Buyukkokten et al. |
| 2005/0164704 A1 | 7/2005 | Winsor |
| 2005/0165584 A1 | 7/2005 | Boody et al. |
| 2005/0165893 A1 | 7/2005 | Feinberg et al. |
| 2005/0172234 A1 | 8/2005 | Chuchla |
| 2005/0188028 A1 | 8/2005 | Brown, Jr. et al. |
| 2005/0198159 A1 | 9/2005 | Kirsch |
| 2005/0198299 A1 | 9/2005 | Beck et al. |
| 2005/0198305 A1 | 9/2005 | Pezaris et al. |
| 2005/0203929 A1 | 9/2005 | Hazarika et al. |
| 2005/0204009 A1 | 9/2005 | Hazarika et al. |
| 2005/0210111 A1 | 9/2005 | Fukudome |
| 2005/0213511 A1 | 9/2005 | Reece et al. |
| 2005/0216300 A1 | 9/2005 | Appelman et al. |
| 2005/0222890 A1 | 10/2005 | Cheng et al. |
| 2005/0223315 A1 | 10/2005 | Shimizu et al. |
| 2005/0228881 A1 | 10/2005 | Reasor et al. |
| 2005/0228899 A1 | 10/2005 | Wendkos et al. |
| 2005/0235224 A1 | 10/2005 | Arend et al. |
| 2005/0278317 A1 | 12/2005 | Gross et al. |
| 2005/0278321 A1 | 12/2005 | Vailaya et al. |
| 2006/0004892 A1 | 1/2006 | Lunt |
| 2006/0004914 A1 | 1/2006 | Kelly et al. |
| 2006/0015533 A1 | 1/2006 | Wolf et al. |
| 2006/0020398 A1 | 1/2006 | Vernon et al. |
| 2006/0031340 A1 | 2/2006 | Mathew et al. |
| 2006/0031775 A1 | 2/2006 | Sattler et al. |
| 2006/0041508 A1 | 2/2006 | Pham et al. |
| 2006/0047747 A1 | 3/2006 | Erickson et al. |
| 2006/0053199 A1 | 3/2006 | Pricken et al. |

(56) References Cited

U.S. PATENT DOCUMENTS

| | | |
|---|---|---|
| 2006/0056015 A1 | 3/2006 | Nishiyama |
| 2006/0059151 A1 | 3/2006 | Martinez et al. |
| 2006/0059238 A1 | 3/2006 | Slater et al. |
| 2006/0064431 A1 | 3/2006 | Kishore et al. |
| 2006/0064434 A1 | 3/2006 | Gilbert et al. |
| 2006/0065733 A1 | 3/2006 | Lee et al. |
| 2006/0074932 A1 | 4/2006 | Fong et al. |
| 2006/0075046 A1 | 4/2006 | Yozell-Epstein et al. |
| 2006/0085752 A1 | 4/2006 | Beadle et al. |
| 2006/0095331 A1 | 5/2006 | O'Malley et al. |
| 2006/0095502 A1 | 5/2006 | Lewis et al. |
| 2006/0101285 A1 | 5/2006 | Chen et al. |
| 2006/0101334 A1 | 5/2006 | Liao et al. |
| 2006/0101350 A1 | 5/2006 | Scott |
| 2006/0106793 A1 | 5/2006 | Liang |
| 2006/0123357 A1 | 6/2006 | Okamura |
| 2006/0129844 A1 | 6/2006 | Oshikiri |
| 2006/0136494 A1 | 6/2006 | Oh |
| 2006/0168059 A1 | 7/2006 | Chang et al. |
| 2006/0168073 A1* | 7/2006 | Kogan et al. ............... 709/206 |
| 2006/0173824 A1 | 8/2006 | Bensky et al. |
| 2006/0173961 A1 | 8/2006 | Turski et al. |
| 2006/0179415 A1 | 8/2006 | Cadiz et al. |
| 2006/0195361 A1 | 8/2006 | Rosenberg |
| 2006/0195474 A1 | 8/2006 | Cadiz et al. |
| 2006/0195785 A1 | 8/2006 | Portnoy et al. |
| 2006/0217116 A1 | 9/2006 | Cassett et al. |
| 2006/0218111 A1 | 9/2006 | Cohen |
| 2006/0224675 A1 | 10/2006 | Fox et al. |
| 2006/0224938 A1 | 10/2006 | Fikes et al. |
| 2006/0242536 A1 | 10/2006 | Yokokawa et al. |
| 2006/0242609 A1 | 10/2006 | Potter et al. |
| 2006/0248151 A1 | 11/2006 | Belakovskiy et al. |
| 2006/0256008 A1 | 11/2006 | Rosenberg |
| 2006/0271630 A1 | 11/2006 | Bensky et al. |
| 2006/0281447 A1 | 12/2006 | Lewis et al. |
| 2006/0282303 A1 | 12/2006 | Hale et al. |
| 2007/0005702 A1 | 1/2007 | Tokuda et al. |
| 2007/0005715 A1 | 1/2007 | LeVasseur et al. |
| 2007/0005750 A1 | 1/2007 | Lunt et al. |
| 2007/0011367 A1* | 1/2007 | Scott ................ G06Q 10/10 710/48 |
| 2007/0016647 A1 | 1/2007 | Gupta et al. |
| 2007/0022447 A1 | 1/2007 | Arseneau et al. |
| 2007/0038720 A1 | 2/2007 | Reding et al. |
| 2007/0050711 A1 | 3/2007 | Walker et al. |
| 2007/0060328 A1 | 3/2007 | Zeike et al. |
| 2007/0071187 A1 | 3/2007 | Apreutesei et al. |
| 2007/0073652 A1 | 3/2007 | Taboada et al. |
| 2007/0078884 A1 | 4/2007 | Ott et al. |
| 2007/0083651 A1 | 4/2007 | Ishida |
| 2007/0088687 A1 | 4/2007 | Bromm et al. |
| 2007/0106780 A1 | 5/2007 | Farnham et al. |
| 2007/0112761 A1 | 5/2007 | Xu et al. |
| 2007/0115991 A1 | 5/2007 | Ramani et al. |
| 2007/0118528 A1 | 5/2007 | Choi et al. |
| 2007/0123222 A1 | 5/2007 | Cox et al. |
| 2007/0124432 A1 | 5/2007 | Holtzman et al. |
| 2007/0129977 A1 | 6/2007 | Forney |
| 2007/0130527 A1* | 6/2007 | Kim .............................. 715/752 |
| 2007/0135110 A1 | 6/2007 | Athale et al. |
| 2007/0143414 A1* | 6/2007 | Daigle ........................ 709/206 |
| 2007/0153989 A1 | 7/2007 | Howell et al. |
| 2007/0156732 A1 | 7/2007 | Surendran et al. |
| 2007/0162432 A1 | 7/2007 | Armstrong et al. |
| 2007/0174304 A1 | 7/2007 | Shrufi et al. |
| 2007/0174432 A1 | 7/2007 | Rhee et al. |
| 2007/0177717 A1 | 8/2007 | Owens et al. |
| 2007/0185844 A1 | 8/2007 | Schachter |
| 2007/0192490 A1 | 8/2007 | Minhas |
| 2007/0192699 A1 | 8/2007 | Lee et al. |
| 2007/0198500 A1 | 8/2007 | Lucovsky et al. |
| 2007/0203991 A1 | 8/2007 | Fisher et al. |
| 2007/0208802 A1 | 9/2007 | Barman et al. |
| 2007/0214141 A1 | 9/2007 | Sittig |
| 2007/0218900 A1 | 9/2007 | Abhyanker |
| 2007/0244881 A1 | 10/2007 | Cha et al. |
| 2007/0250585 A1 | 10/2007 | Ly et al. |
| 2007/0255794 A1 | 11/2007 | Coutts |
| 2007/0266001 A1 | 11/2007 | Williams et al. |
| 2007/0271527 A1 | 11/2007 | Paas et al. |
| 2007/0273517 A1 | 11/2007 | Govind |
| 2007/0282956 A1 | 12/2007 | Staats |
| 2007/0288578 A1 | 12/2007 | Pantalone |
| 2007/0294428 A1 | 12/2007 | Guy et al. |
| 2008/0005247 A9 | 1/2008 | Khoo |
| 2008/0005249 A1 | 1/2008 | Hart |
| 2008/0010460 A1 | 1/2008 | Schuschan |
| 2008/0031241 A1 | 2/2008 | Toebes et al. |
| 2008/0037721 A1 | 2/2008 | Yao et al. |
| 2008/0040370 A1 | 2/2008 | Bosworth |
| 2008/0040435 A1 | 2/2008 | Buschi et al. |
| 2008/0040474 A1 | 2/2008 | Zuckerberg |
| 2008/0040475 A1 | 2/2008 | Bosworth |
| 2008/0055263 A1 | 3/2008 | Lemay et al. |
| 2008/0056269 A1 | 3/2008 | Madhani et al. |
| 2008/0059428 A1 | 3/2008 | Kinder |
| 2008/0065701 A1 | 3/2008 | Lindstrom et al. |
| 2008/0071872 A1 | 3/2008 | Gross |
| 2008/0077614 A1* | 3/2008 | Roy ........................... 707/104.1 |
| 2008/0104052 A1 | 5/2008 | Ryan et al. |
| 2008/0113674 A1 | 5/2008 | Baig |
| 2008/0114758 A1 | 5/2008 | Rupp et al. |
| 2008/0119201 A1 | 5/2008 | Kolber et al. |
| 2008/0120411 A1* | 5/2008 | Eberle ........................ 709/225 |
| 2008/0122796 A1 | 5/2008 | Jobs et al. |
| 2008/0134081 A1 | 6/2008 | Jeon et al. |
| 2008/0147639 A1 | 6/2008 | Hartman et al. |
| 2008/0147810 A1 | 6/2008 | Kumar et al. |
| 2008/0154751 A1 | 6/2008 | Miles |
| 2008/0162347 A1 | 7/2008 | Wagner |
| 2008/0162649 A1 | 7/2008 | Lee et al. |
| 2008/0162651 A1 | 7/2008 | Madnani |
| 2008/0163164 A1 | 7/2008 | Chowdhary et al. |
| 2008/0170158 A1 | 7/2008 | Jung et al. |
| 2008/0172362 A1 | 7/2008 | Shacham et al. |
| 2008/0172464 A1 | 7/2008 | Thattai et al. |
| 2008/0183832 A1 | 7/2008 | Kirkland et al. |
| 2008/0201304 A1 | 8/2008 | Sue |
| 2008/0208812 A1 | 8/2008 | Quoc et al. |
| 2008/0216092 A1* | 9/2008 | Serlet ......................... 719/315 |
| 2008/0220752 A1 | 9/2008 | Forstall et al. |
| 2008/0222279 A1 | 9/2008 | Cioffi et al. |
| 2008/0222546 A1 | 9/2008 | Mudd et al. |
| 2008/0235353 A1 | 9/2008 | Cheever et al. |
| 2008/0235681 A1 | 9/2008 | Barnett |
| 2008/0242277 A1 | 10/2008 | Chen et al. |
| 2008/0243841 A1 | 10/2008 | Bonnet et al. |
| 2008/0244070 A1 | 10/2008 | Kita et al. |
| 2008/0261569 A1 | 10/2008 | Britt et al. |
| 2008/0270038 A1 | 10/2008 | Partovi et al. |
| 2008/0270939 A1 | 10/2008 | Mueller |
| 2008/0275748 A1 | 11/2008 | John |
| 2008/0275865 A1 | 11/2008 | Kretz et al. |
| 2008/0293403 A1 | 11/2008 | Quon et al. |
| 2008/0301166 A1 | 12/2008 | Sugiyama et al. |
| 2008/0301175 A1 | 12/2008 | Applebaum et al. |
| 2008/0301245 A1 | 12/2008 | Estrada et al. |
| 2008/0307046 A1 | 12/2008 | Baek et al. |
| 2008/0307066 A1 | 12/2008 | Amidon et al. |
| 2008/0313650 A1 | 12/2008 | Arnquist et al. |
| 2008/0319943 A1 | 12/2008 | Fischer |
| 2008/0320417 A1 | 12/2008 | Begley et al. |
| 2009/0005076 A1 | 1/2009 | Forstall et al. |
| 2009/0010353 A1* | 1/2009 | She et al. .................... 375/267 |
| 2009/0012806 A1 | 1/2009 | Ricordi et al. |
| 2009/0029674 A1 | 1/2009 | Brezina et al. |
| 2009/0030872 A1 | 1/2009 | Brezina et al. |
| 2009/0030919 A1 | 1/2009 | Brezina et al. |
| 2009/0030927 A1 | 1/2009 | Cases et al. |
| 2009/0030940 A1 | 1/2009 | Brezina et al. |
| 2009/0031232 A1 | 1/2009 | Brezina et al. |
| 2009/0031244 A1 | 1/2009 | Brezina et al. |
| 2009/0031245 A1 | 1/2009 | Brezina et al. |

(56) References Cited

U.S. PATENT DOCUMENTS

| | | |
|---|---|---|
| 2009/0037541 A1* | 2/2009 | Wilson .................. G06Q 10/10 709/206 |
| 2009/0041224 A1 | 2/2009 | Bychkov et al. |
| 2009/0048994 A1 | 2/2009 | Applebaum et al. |
| 2009/0054091 A1 | 2/2009 | van Wijk et al. |
| 2009/0070412 A1 | 3/2009 | D'Angelo |
| 2009/0077026 A1 | 3/2009 | Yanagihara |
| 2009/0083278 A1 | 3/2009 | Zhao et al. |
| 2009/0100384 A1 | 4/2009 | Louch |
| 2009/0106415 A1 | 4/2009 | Brezina et al. |
| 2009/0106676 A1 | 4/2009 | Brezina et al. |
| 2009/0111495 A1 | 4/2009 | Sjolin et al. |
| 2009/0112678 A1 | 4/2009 | Luzardo |
| 2009/0119678 A1 | 5/2009 | Shih et al. |
| 2009/0125321 A1 | 5/2009 | Charlebois et al. |
| 2009/0125462 A1 | 5/2009 | Krishnaswamy et al. |
| 2009/0125517 A1 | 5/2009 | Krishnaswamy et al. |
| 2009/0125585 A1 | 5/2009 | Krishnaswamy et al. |
| 2009/0132949 A1 | 5/2009 | Bosarge |
| 2009/0156170 A1 | 6/2009 | Rossano et al. |
| 2009/0157717 A1 | 6/2009 | Palahnuk et al. |
| 2009/0164902 A1 | 6/2009 | Cohen et al. |
| 2009/0171930 A1 | 7/2009 | Vaughan et al. |
| 2009/0171979 A1 | 7/2009 | Lubarski et al. |
| 2009/0174680 A1 | 7/2009 | Anzures et al. |
| 2009/0177754 A1 | 7/2009 | Brezina et al. |
| 2009/0182552 A1 | 7/2009 | Fyke et al. |
| 2009/0182788 A1 | 7/2009 | Chung et al. |
| 2009/0187991 A1 | 7/2009 | Freericks et al. |
| 2009/0191899 A1 | 7/2009 | Wilson et al. |
| 2009/0198688 A1 | 8/2009 | Venkataraman et al. |
| 2009/0204903 A1 | 8/2009 | Edelen et al. |
| 2009/0209286 A1 | 8/2009 | Bentley et al. |
| 2009/0213088 A1 | 8/2009 | Hardy et al. |
| 2009/0216847 A1 | 8/2009 | Krishnaswamy et al. |
| 2009/0217178 A1 | 8/2009 | Niyogi et al. |
| 2009/0228555 A1 | 9/2009 | Joviak et al. |
| 2009/0234815 A1 | 9/2009 | Boerries et al. |
| 2009/0234925 A1 | 9/2009 | Seippel, III et al. |
| 2009/0240669 A1 | 9/2009 | Ando et al. |
| 2009/0248415 A1 | 10/2009 | Jablokov et al. |
| 2009/0249198 A1 | 10/2009 | Davis et al. |
| 2009/0271370 A1 | 10/2009 | Jagadish et al. |
| 2009/0271409 A1 | 10/2009 | Ghosh |
| 2009/0276713 A1 | 11/2009 | Eddy |
| 2009/0299824 A1 | 12/2009 | Barnes, Jr. |
| 2009/0300127 A1 | 12/2009 | Du |
| 2009/0300546 A1 | 12/2009 | Kwok et al. |
| 2009/0300596 A1 | 12/2009 | Tyhurst et al. |
| 2009/0306981 A1 | 12/2009 | Cromack et al. |
| 2009/0313573 A1 | 12/2009 | Paek et al. |
| 2009/0319329 A1 | 12/2009 | Aggarwal et al. |
| 2009/0327226 A1 | 12/2009 | Brito et al. |
| 2009/0327849 A1 | 12/2009 | Kavanagh et al. |
| 2009/0328161 A1 | 12/2009 | Puthenkulam et al. |
| 2010/0009332 A1 | 1/2010 | Yaskin et al. |
| 2010/0030715 A1 | 2/2010 | Eustice et al. |
| 2010/0036833 A1 | 2/2010 | Yeung et al. |
| 2010/0049534 A1 | 2/2010 | Whitnah |
| 2010/0057858 A1 | 3/2010 | Shen et al. |
| 2010/0057859 A1 | 3/2010 | Shen et al. |
| 2010/0060595 A1 | 3/2010 | Lee et al. |
| 2010/0062753 A1 | 3/2010 | Wen et al. |
| 2010/0070875 A1 | 3/2010 | Turski et al. |
| 2010/0073284 A1 | 3/2010 | Dods et al. |
| 2010/0077041 A1 | 3/2010 | Cowan et al. |
| 2010/0082693 A1 | 4/2010 | Hugg et al. |
| 2010/0083182 A1 | 4/2010 | Liu et al. |
| 2010/0088340 A1 | 4/2010 | Muller et al. |
| 2010/0094869 A1 | 4/2010 | Ebanks |
| 2010/0094911 A1 | 4/2010 | Bird |
| 2010/0100899 A1 | 4/2010 | Bradbury et al. |
| 2010/0121831 A1 | 5/2010 | Lin et al. |
| 2010/0131447 A1 | 5/2010 | Creutz et al. |
| 2010/0153832 A1 | 6/2010 | Markus et al. |
| 2010/0158214 A1 | 6/2010 | Gravino et al. |
| 2010/0161547 A1 | 6/2010 | Carmel et al. |
| 2010/0161729 A1 | 6/2010 | Leblanc et al. |
| 2010/0162171 A1 | 6/2010 | Felt et al. |
| 2010/0164957 A1 | 7/2010 | Lindsay |
| 2010/0167700 A1 | 7/2010 | Brock et al. |
| 2010/0169327 A1 | 7/2010 | Lindsay |
| 2010/0174784 A1 | 7/2010 | Levey et al. |
| 2010/0185610 A1 | 7/2010 | Lunt |
| 2010/0191844 A1 | 7/2010 | He et al. |
| 2010/0216509 A1* | 8/2010 | Riemer ............. H04M 1/72577 455/557 |
| 2010/0228560 A1 | 9/2010 | Balasaygun et al. |
| 2010/0229096 A1 | 9/2010 | Maiocco et al. |
| 2010/0229157 A1 | 9/2010 | Ergan et al. |
| 2010/0229223 A1 | 9/2010 | Shepard |
| 2010/0235375 A1 | 9/2010 | Sidhu et al. |
| 2010/0241579 A1 | 9/2010 | Bassett et al. |
| 2010/0250682 A1 | 9/2010 | Goldberg et al. |
| 2010/0273456 A1 | 10/2010 | Wolovitz et al. |
| 2010/0281535 A1 | 11/2010 | Perry et al. |
| 2010/0306185 A1 | 12/2010 | Smith |
| 2010/0312837 A1 | 12/2010 | Bodapati et al. |
| 2010/0318614 A1 | 12/2010 | Sager et al. |
| 2010/0330972 A1 | 12/2010 | Angiolillo |
| 2011/0010423 A1 | 1/2011 | Thatcher et al. |
| 2011/0035451 A1 | 2/2011 | Smith et al. |
| 2011/0040726 A1 | 2/2011 | Crosbie et al. |
| 2011/0072052 A1 | 3/2011 | Skarin et al. |
| 2011/0078259 A1 | 3/2011 | Rashad et al. |
| 2011/0086627 A1 | 4/2011 | Khosravi |
| 2011/0087969 A1 | 4/2011 | Hein et al. |
| 2011/0119593 A1 | 5/2011 | Jacobson et al. |
| 2011/0145192 A1 | 6/2011 | Quintela et al. |
| 2011/0145219 A1 | 6/2011 | Cierniak et al. |
| 2011/0173274 A1 | 7/2011 | Sood |
| 2011/0173547 A1 | 7/2011 | Lewis et al. |
| 2011/0191337 A1 | 8/2011 | Cort et al. |
| 2011/0191340 A1 | 8/2011 | Cort et al. |
| 2011/0191717 A1 | 8/2011 | Cort et al. |
| 2011/0191768 A1 | 8/2011 | Smith |
| 2011/0196802 A1* | 8/2011 | Ellis .................. G06F 17/30654 705/321 |
| 2011/0201275 A1 | 8/2011 | Jabara et al. |
| 2011/0219317 A1 | 9/2011 | Thatcher et al. |
| 2011/0225293 A1 | 9/2011 | Rathod |
| 2011/0231407 A1 | 9/2011 | Gupta et al. |
| 2011/0235790 A1 | 9/2011 | Strope et al. |
| 2011/0252383 A1 | 10/2011 | Miyashita |
| 2011/0276396 A1 | 11/2011 | Rathod |
| 2011/0282905 A1 | 11/2011 | Polis et al. |
| 2011/0291860 A1 | 12/2011 | Ozaki et al. |
| 2011/0291933 A1 | 12/2011 | Holzer |
| 2011/0298701 A1 | 12/2011 | Holzer |
| 2012/0011204 A1 | 1/2012 | Morin et al. |
| 2012/0017158 A1 | 1/2012 | Maguire et al. |
| 2012/0023416 A1 | 1/2012 | Khoo |
| 2012/0036254 A1 | 2/2012 | Onuma |
| 2012/0041907 A1 | 2/2012 | Wang et al. |
| 2012/0054681 A1 | 3/2012 | Cort et al. |
| 2012/0060102 A1 | 3/2012 | Shohfi et al. |
| 2012/0079023 A1 | 3/2012 | Tejada-Gamero et al. |
| 2012/0084461 A1 | 4/2012 | Athias et al. |
| 2012/0089678 A1 | 4/2012 | Cort et al. |
| 2012/0089690 A1 | 4/2012 | Hein et al. |
| 2012/0110080 A1 | 5/2012 | Panyam et al. |
| 2012/0110096 A1 | 5/2012 | Smarr et al. |
| 2012/0150970 A1 | 6/2012 | Peterson et al. |
| 2012/0150978 A1 | 6/2012 | Monaco et al. |
| 2012/0150979 A1 | 6/2012 | Monaco |
| 2012/0166999 A1 | 6/2012 | Thatcher et al. |
| 2012/0197871 A1 | 8/2012 | Mandel et al. |
| 2012/0198348 A1 | 8/2012 | Park |
| 2012/0204089 A1 | 8/2012 | Boudreau et al. |
| 2012/0246065 A1 | 9/2012 | Yarvis et al. |
| 2012/0259834 A1 | 10/2012 | Broder et al. |
| 2012/0271822 A1 | 10/2012 | Schwendimann et al. |
| 2012/0278428 A1 | 11/2012 | Harrison et al. |
| 2012/0310977 A1 | 12/2012 | Bush et al. |

(56) References Cited

U.S. PATENT DOCUMENTS

| | | |
|---|---|---|
| 2012/0330658 A1 | 12/2012 | Bonforte |
| 2012/0330980 A1 | 12/2012 | Rubin et al. |
| 2012/0331418 A1 | 12/2012 | Bonforte |
| 2013/0007627 A1 | 1/2013 | Monaco |
| 2013/0014021 A1 | 1/2013 | Bau et al. |
| 2013/0053074 A1 | 2/2013 | Sanchez et al. |
| 2013/0080915 A1 | 3/2013 | Lewis et al. |
| 2013/0091288 A1 | 4/2013 | Shalunov et al. |
| 2013/0173712 A1 | 7/2013 | Monjas Llorente et al. |
| 2013/0246931 A1 | 9/2013 | Harris et al. |
| 2013/0260795 A1 | 10/2013 | Papakipos et al. |
| 2014/0011481 A1 | 1/2014 | Kho |
| 2014/0081914 A1 | 3/2014 | Smith et al. |
| 2014/0081964 A1 | 3/2014 | Rubin et al. |
| 2014/0087687 A1 | 3/2014 | Brezina et al. |
| 2014/0089304 A1 | 3/2014 | Rubin et al. |
| 2014/0089411 A1 | 3/2014 | Rubin et al. |
| 2014/0095433 A1 | 4/2014 | Cort et al. |
| 2014/0100861 A1 | 4/2014 | Ledet |
| 2014/0115086 A1 | 4/2014 | Chebiyyam |
| 2014/0156650 A1 | 6/2014 | Jacobson |
| 2014/0207761 A1 | 7/2014 | Brezina et al. |
| 2014/0214981 A1 | 7/2014 | Mallet et al. |
| 2014/0215626 A1 | 7/2014 | Pam et al. |
| 2014/0280097 A1 | 9/2014 | Lee et al. |
| 2014/0287786 A1 | 9/2014 | Bayraktar et al. |
| 2015/0074213 A1 | 3/2015 | Monaco |
| 2015/0170650 A1 | 6/2015 | Bonforte |
| 2015/0222719 A1 | 8/2015 | Hein et al. |
| 2016/0070787 A1 | 3/2016 | Brezina et al. |
| 2016/0182661 A1 | 6/2016 | Brezina et al. |

FOREIGN PATENT DOCUMENTS

| | | |
|---|---|---|
| EP | 0944002 | 9/1999 |
| JP | 2003006116 | 1/2003 |
| JP | 2007249307 | 9/2007 |
| KR | 20060056015 | 5/2006 |
| KR | 1020090068819 | 6/2009 |
| KR | 1020090112257 | 10/2009 |
| KR | 1020090115239 | 11/2009 |
| KR | 1020020060386 | 8/2012 |
| WO | 03098515 | 11/2003 |
| WO | 2007037875 | 4/2007 |
| WO | 2007143232 | 12/2007 |
| WO | 2012082886 | 6/2012 |
| WO | 2012082929 | 6/2012 |

OTHER PUBLICATIONS

Bernstein, Michael S. et al., "Enhancing Directed Content Sharing on the Web," Proceedings of the 28th International Conference on Human Factors in Computing Systems, Atlanta, GA, Apr. 10-15, 2010, pp. 971-980.
Carvalho, Vitor R. et al., "Ranking Users for Intelligent Message Addressing," Proceedings of the 30th European Conference on Information Retrieval, Glasgow, England, Mar. 30-Apr. 3, 2008, pp. 321-333.
Culotta, Aron et al., "Extracting Social Networks and Contact Information from Email and the Web," Proceedings of the First Conference on Email and Anti-Spam (CEAS), Mountain View, CA, Jul. 30-31, 2004 (document provided includes third-party comments submitted under the USPTO PeerToPatent program).
Elsayed, Tamer et al., "Personal Name Resolution in Email: A Heuristic Approach," University of Maryland Technical Report No. TR-LAMP-150, Mar. 17, 2008.
Fitzpatrick, Brad, "AddressBooker," Github Social Coding, located at http://addressbooker.appspot.com/, Nov. 28, 2008 (document provided includes third-party comments submitted under the USPTO PeerToPatent program).
Google Inc. "OpenSocial Tutorial," located at http://code.google.com/apis/opensocial/articles/tutorial/tutorial-0.8.html, Aug. 2008.
Google Inc., "Automatic Updating of Contacts," Gmail help forum, located at http://74.125.4.16/support/forum/p/gmail/thread?tid=03f7b692150d9242&hl=en, Apr. 27, 2009 (document provided includes third-party comments submitted under the USPTO PeerToPatent program).
Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006 (document provided includes third-party comments submitted under the USPTO PeerToPatent program).
International Patent Application PCT/US10/34782, International Search Report, Dec. 22, 2010.
International Patent Application PCT/US10/34782, Written Opinion, Dec. 22, 2010.
International Patent Application PCT/US10/35405, International Search Report and Written Opinion, Jan. 3, 2011.
International Patent Application PCT/US10/52081, International Search Report and Written Opinion, May 20, 2011.
International Patent Application PCT/US10/56560, International Search Report and Written Opinion, Jun. 21, 2011.
International Patent Application PCT/US11/64958, International Search Report and Written Opinion, Jul. 31, 2012.
International Patent Application PCT/US12/043523, International Search Report and Written Opinion, Nov. 28, 2012.
International Patent Application PCT/US2011/064892, International Search Report and Written Opinion, Aug. 22, 2012.
International Patent Application PCT/US2012/043507, International Search Report and Written Opinion, Jan. 3, 2013.
Microsoft Corporation, "About AutoComplete Name Suggesting," Microsoft Outlook 2003 help forum, located at http://office.microsoft.com/en-us/outlook/HP063766471033.aspx, 2003.
Oberhaus, Kristin, "Look for Cues: Targeting Without Personally Identifiable Information," W3i, LLC blog entry located at http://blog.w3i.com/2009/09/03/looking-for-cues-targeting-without-personally-identifiable-information/, Sep. 3, 2009.
OpenSocial Foundation, "Social Application Tutorial (v0.9)," located at http://wiki.opensocial.org/index.php?title=Social_Application_Tutorial, accessed Oct. 8, 2010.
PCWorld Communications, Inc., "Your Contacts Are Forever: Self-Updating Address Book," located at http://www.pcworld.com/article/48192/your_contacts_are_forever_selfupdating_address_book.html, May 1, 2001 (document provided includes third-party comments submitted under the USPTO PeerToPatent program).
U.S. Appl. No. 61/407,018, filed Oct. 27, 2010.
W3i, LLC, "Advertiser Feedback System (AFS)," company product description. Sep. 22, 2009.
Wikimedia Foundation, Inc., "Machine Learning," Wikipedia encyclopedia entry located at http://en.wikipedia.org/wiki/ Machine_learning, Jan. 30, 2011.
European Patent Application No. 11849271.9, Extended Search Report, Apr. 3, 2014.
European Patent Application No. 12801970.0, Extended Search Report, Oct. 23, 2014.
Extended European Search Report, EP 10 78 3783, dated Mar. 24, 2014.
International Patent Application PCT/US10/34782, International Search Report and Written Opinion, Dec. 22, 2010.
European Patent Application 12801998.1, Extended Search Report, Feb. 10, 2015.
Epstein, "Harnessing User Data to Improve Facebook Features", Doctoral dissertation, Boston College, May 12, 2010.
Hannon et ai., "Recommending Twitter Users to Follow Using Content and Collaborative Filtering Approaches", RecSys2010, Sep. 26-30, 2010, Barcelona, Spain.
"OpenSocial Specification v0.9", OpenSocial and Gadgets Specification Group, Apr. 2009.
"The Ultimate Guide for Everything Twitter", Webdesigner Depot, archive.org webpage https://web.archive.org/web/20090325042115/http://www.webdesignerdepot.com/2009/03/the-ultimate-guide-for-everything-twitter/ from Mar. 25, 2009.

(56) References Cited

OTHER PUBLICATIONS

European Patent Application No. 10797483.4, extended European Search Report, Dec. 20, 2016.

* cited by examiner

DISPLAY OF INFORMATION IN ELECTRONIC COMMUNICATIONS

PRIORITY APPLICATION

This patent application claims priority to U.S. Provisional Application No. 60/951,880, filed on Jul. 25, 2007, entitled, "Presentation of Personal and Public Data Queried Through Implicit Actions", the contents of which are incorporated by reference.

BACKGROUND

Electronic communications between persons for both business and personal use have increased substantially in recent years. In addition to the number of communications increasing, the number of available communication mediums has also increased. In addition to e-mail communications and telephone communications, additional forms of communication have become common in recent years, including instant messaging, social network messaging and commenting, message board posting, text messaging, and Voice Over Internet Protocol communications.

These additional forms of communication have led to individuals exchanging communications with more people than ever before, which leads to an even higher increase in the number of communications sent and received by an individual.

SUMMARY

The present disclosure relates to information presentation in electronic communications including email or person-specific auto-replies and signatures.

In a first aspect, a computer implemented method for presenting information related to historical communication and personal data can include collecting historical communication data and personal data relating to a portion of a plurality of communications, a sender of one or more of the communications or one or more recipients of the communications. The method can further include depositing the collected data into a repository of historical communication data and personal data. The method can further include generating customized content for inclusion in an electronic communication based at least in part on the historical communication data and personal data. The method can further include presenting the customized content in the electronic communication in response to user behavior. The user behavior can be selected from the group comprising opening a communication, viewing a communication, reading a communication, writing a communication, performing a search, selecting a person's name, selecting a communication summary, and selecting an attribute associated with the one or more items.

The method can further include querying one or more sources of information to derive the historical communication data and the personal data, and generating and presenting email- or person-specific auto-replies and signatures. The method can further include requesting information from a sender of a communication or one or more recipients of the communication. The method can further include displaying the one or more items in an additional portion of a user interface (e.g., in a panel) within an e-mail client, web browser, or instant message window. The method can further include displaying the one or more items integrated with a body of the communication using one or more display methods selected from the group comprising highlighting, underlining, adding hyper links, adding text, adding images, adding video, and adding attachments.

The method can further include tracking mouse movements, mouse locations, keyboard strokes, mouse clicks, or active windows in order to determine if the user has made an implicit request to view customized content. The method can further include sharing some or all of the customized content among a network of participants. The method can further include sharing different amounts of data from the repository with each participant based on preference settings. The method can further include allowing a user to select one or more of the one or more presented items and automatically generating a communication in response to the user selection.

DETAILED DESCRIPTION

Figure 1:
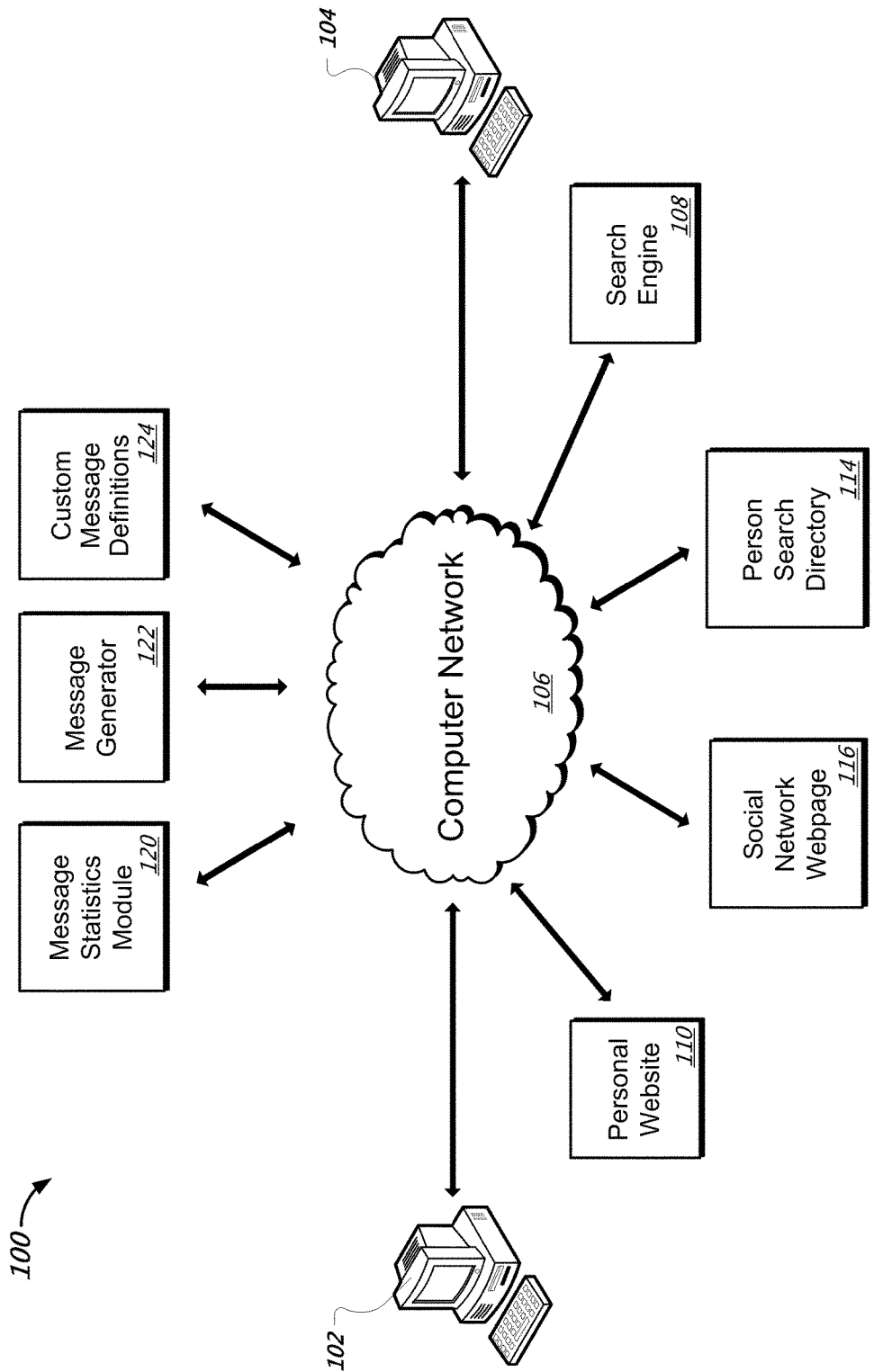
FIG. 1 is a block diagram of an example communication delivery system.

FIG. 1 shows an example communication delivery system 100. In the system 100, a first device (e.g., computer 102) belonging to a first user can transmit a communication to a second device (e.g., computer 104) belonging to a second user over a computer network 106. The computer network 106 can be the Internet, an intranet, a LAN system or a company's internal computer network. In some implementations, the computer 102 and the computer 104 can be desktop computers, laptop computers, cell phones, web enabled televisions, or personal digital assistants. The communication transmitted from the computer 102 to the computer 104 can be an e-mail, phone call, instant message, text message, social network message or comment, message board post, or voice over IP communication.

The computer 104 can extract data from one or more communications about the first user. This data can be used to make a profile similar to the profile 330 shown in FIG. 3B. Data extracted from other communications with the first user can also be used to create a profile for the first user. Data that is extracted from communications with the first user can be used to query websites, search engines, person search directories and other sources of information for additional information about the first user that can be used to create a profile. Information from communications that can be used as search criteria include names, screen names, social network profile names, social network profile URLs, physical addresses, website URLs, e-mail addresses, or telephone numbers. Information that is collected as a result of these queries can be used in future searches to identify additional information that can be used to create a profile or to customize future electronic communications with the first user or other users.

For example, the computer 104 can receive an e-mail sent by the first user from the computer 102. The computer 104 can perform a search using a search engine 108 with the first user's e-mail address as the search criteria. The search engine 108 can return a search result that includes the first user's phone number. This phone number can be displayed as part of a profile for the first user. The search engine 108 can also return the URL for or link to a personal website 110 belonging to the first user. The personal website 110 may contain additional information about the first user that can be used to create a profile, such as additional contact information or biographical information. THIS is where we should add in an example about how we gather data, store it in a profile, then use it to customize a signature, a auto reply, etc. . . .

In another example, the computer 104 can perform a search using a person search directory 114 with the first user's name or other contact information as the search criteria. The person search directory 114 can return search results with additional contact information and other information that can be used to create a profile for the first user.

In another example, the computer 104 can receive an e-mail sent by the first user from the computer 102. The e-mail can contain a social network profile name for the first user. The computer 104 can extract this social network profile name from the e-mail and use it to access a social network webpage 116. The social network webpage 116 can contain additional contact information and other information that can be extracted and used to create a profile for the first user. The social network webpage 116 can also contain additional contacts that can be associated with the first user in a profile. For example, persons on the friends list of the social network webpage 116, or persons who have posted comments or messages on the social network webpage 116 can be listed as contacts in a contact network for the first user.

The communication delivery system 100 can include a communication statistics module 120. In some implementations, the communication statistics module 120 can continuously monitor communications shared between computers 102 and 104 and use the information to generate communication usage statistics. For example, the statistics may be displayed within summaries in a user's email message, on a social network site, and so on. The communication statistics module 120 may be responsible for synchronizing the information, for example, by providing data feeds to social network pages 116, personal websites 110, etc. The data feeds can include message statistics such as the number of messages sent and received by the user, the number of unique contacts, etc.

In some implementations, the communication statistics module 120 may provide information when queried. For example, an email client or other application executing on the communication system 100 may occasionally request "fun fact" statistics such as the average response time of the user's contact who responds the fastest to the user's messages. In some implementations, "fun facts" or other statistical information can be generated from past events (e.g., messages sent and received) associated with a user's existing communication system, such as when the communication system is initially installed on a user's computer 102 and generates statistics from the user's existing inbox. In some implementations, these facts can be displayed to the user who can optionally include the facts in pre-formatted click-and-send messages to the corresponding contacts.

The communication delivery system 100 can include a message generator module 122. In some implementations, the message generator module 122 can generate email- and person-specific auto-replies and signatures, such as messages 222-228 described in detail below in reference to FIG. 2B. For example, the messages generated by the message generator module 122 can use information collected by the communication statistics module 120 or other information (e.g., other information in a profile).

The communication delivery system 100 can include a custom message definitions module 124. For example, a user of the system 100 can use the custom message definitions module 124 to define customized messages to be sent to other users. In some implementations, the custom message definitions module 124 can be an application that executes on a user's computer, such as computers 102 and/or 104. The application can interface with several communication services 108-116 and use historical communication and personal data gathered by the system 100. The custom message definitions module 124 application can include a tool to customize communications to individuals based on the historical data. In some implementations, the module 124 can be remote from the user's computer and accessed using the computer network 106. In some implementations, the module 124 can be bundled with an email client, or can be a standalone system executing in parallel with the email client. In some implementations, the module 124 can appear to the user as being seamlessly integrated within the system 100.

Figure 2A:
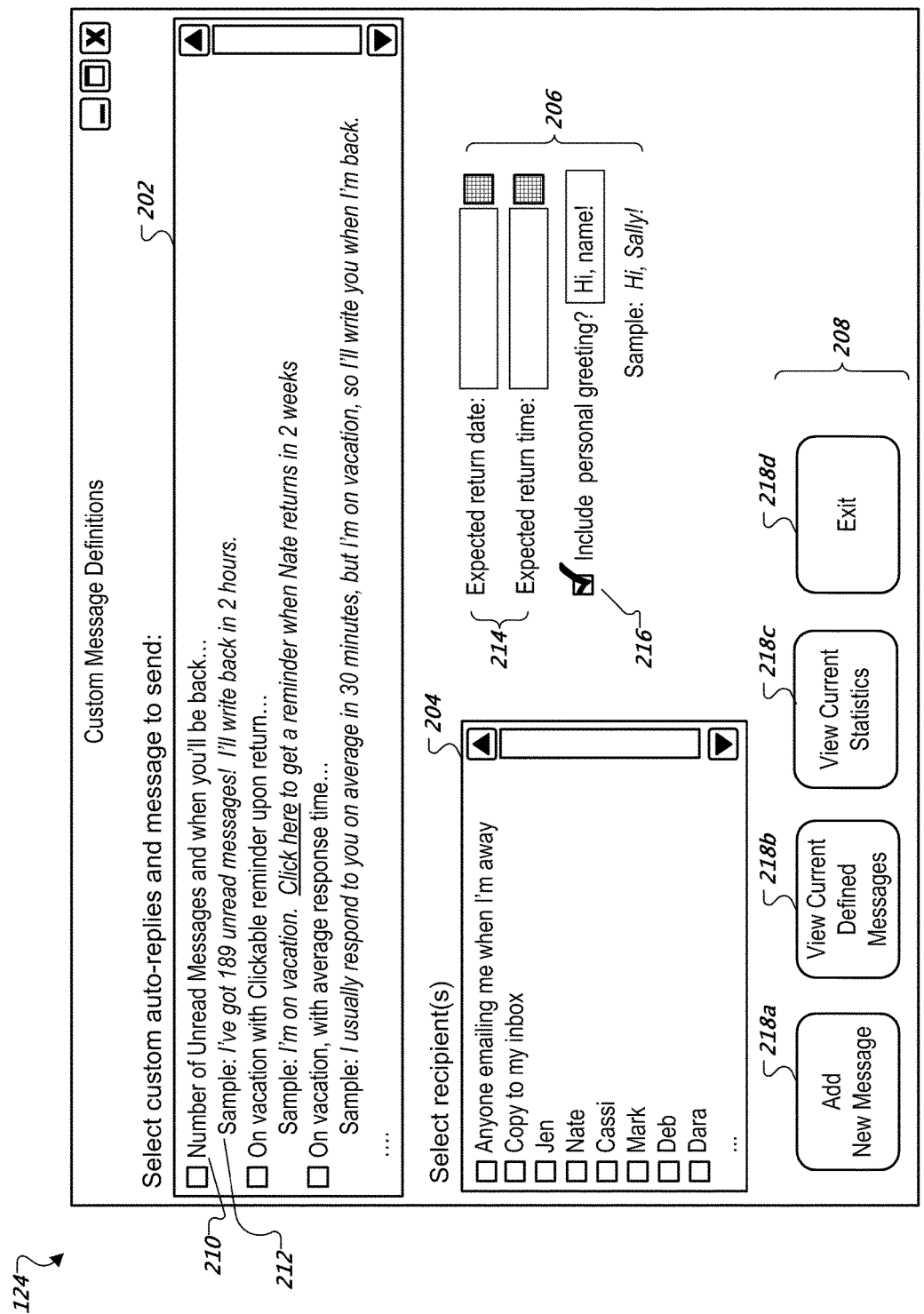
FIG. 2A shows an example custom message definitions module.

FIG. 2A shows an example custom message definitions module 124. In the example shown in FIG. 2A, the module 124 includes a message selection area 202, a recipients area 204, a parameters area 206, and controls 208. In some implementations, the module 124 can include other GUI displays and controls not shown in FIG. 2A. The user can use the areas 202-206 and controls 208 to define specific messages to be sent as customized and/or personalized messages and the recipients to which to send the messages.

In some implementations, the custom message definitions module 124 can include features often associated with "rules" or other interfaces commonly used in email clients. For example, the custom message definitions module 124 can allow the user to control the generation of custom messages based on personal contact, subject, email size, attachments, message content, etc.

The message selection area 202 area can include various messages that the user can elect to send to various contacts. For example, the user may elect to create a definition for a customized message to be sent while the user is on vacation, such as by selecting a "Number of Unread Messages and when you'll be back . . . " message 210. In some implementations, the messages displayed in the message selection area 202 can include a sample formatted message 212, such as "I've got 189 unread messages! I'll write back in 2 hours."

In some implementations, the message selection area 202 can be implemented as a scrollable list, a group of checkboxes, a group of radio buttons, or any other presentation method. In some implementations, the system 100 can allow the user to make more than one selection from the message selection area 202 at the same time. In some implementations, the list of definable messages can be combined with a list of already-defined messages. In some implementations, the user can define his own message, using placeholders or other controls for inserting personalized names, dates, times, or other specific data.

The recipients area 204 can list all of the user's contacts to which customized and/or personal messages can be sent. For example, after selecting one or more messages in the message selection area 202, the user can select the recipients 204 associated with the message(s). In some implementations, the list can have an appearance similar to that of the user's email client. In some implementations, the list can be a combined display of the user's contacts from various communication systems, such as email, instant messaging, social network messaging and commenting, message board posting, text messaging, Voice Over Internet Protocol communications, and so on.

The parameters area 206 can include any parameters that the user may want to supply, such as the user's expected return date and time 214 and a personal greeting 216. Return dates and times 214 can be used for meetings, sick days, vacations, etc. The personal greeting 216 can be used by the system as an initial greeting "Hi, Sally . . . ". As a result, messages such as those listed in the messages area 202 can be prefaced with the initial greeting 216.

In some implementations, the parameters area 206 can contain values obtained automatically from other applications. For example, if the user has updated his calendar (e.g., in an email client or calendar system) for an expected vacation, the message selection area 202 can automatically obtain the dates and/or times in the parameters area 206.

The controls 208 can include any kind of buttons 218a-218d or other controls that the user can employ to interact with the custom message definitions module 124. For example, the user may use the add button 218a to add one or more messages to the current definitions. For example, the user may select the add button 218 after specifying one or more messages in the messages area 202, one or more recipients in the recipients area 204, and any associated parameters in the parameters area 206.

In some implementations, the view current defined messages 218b button or other control can allow the user to view any personalized or custom messages already defined. In some implementations, selecting the button 218b can automatically identify and allow purging of obsolete messages. For example, obsolete messages may include messages based on vacations, meetings, etc. for which the dates have passed. In some implementations, several types of messages can exist which typically do not become obsolete (e.g., highest number of messages received from any one user).

In some implementations, the user can use the view current statistics button 218c to display various communication statistics. For example, the user may be interested in seeing which contact has the slowest response time. Acquiring this or other statistical information may entice the user to define yet further messages, such as to notify a particular slow responder with information about that contact's average response time. In some implementations, while the user is composing a message, such as in an email client, additional features of the system may allow the user to explicitly add custom content in the signature or other area of the email message. In some implementations, the user can set up "rules" or other controls to automatically include certain custom content in a signature block, such as a personalized message corresponding to the recipient of the message.

Figure 2B:
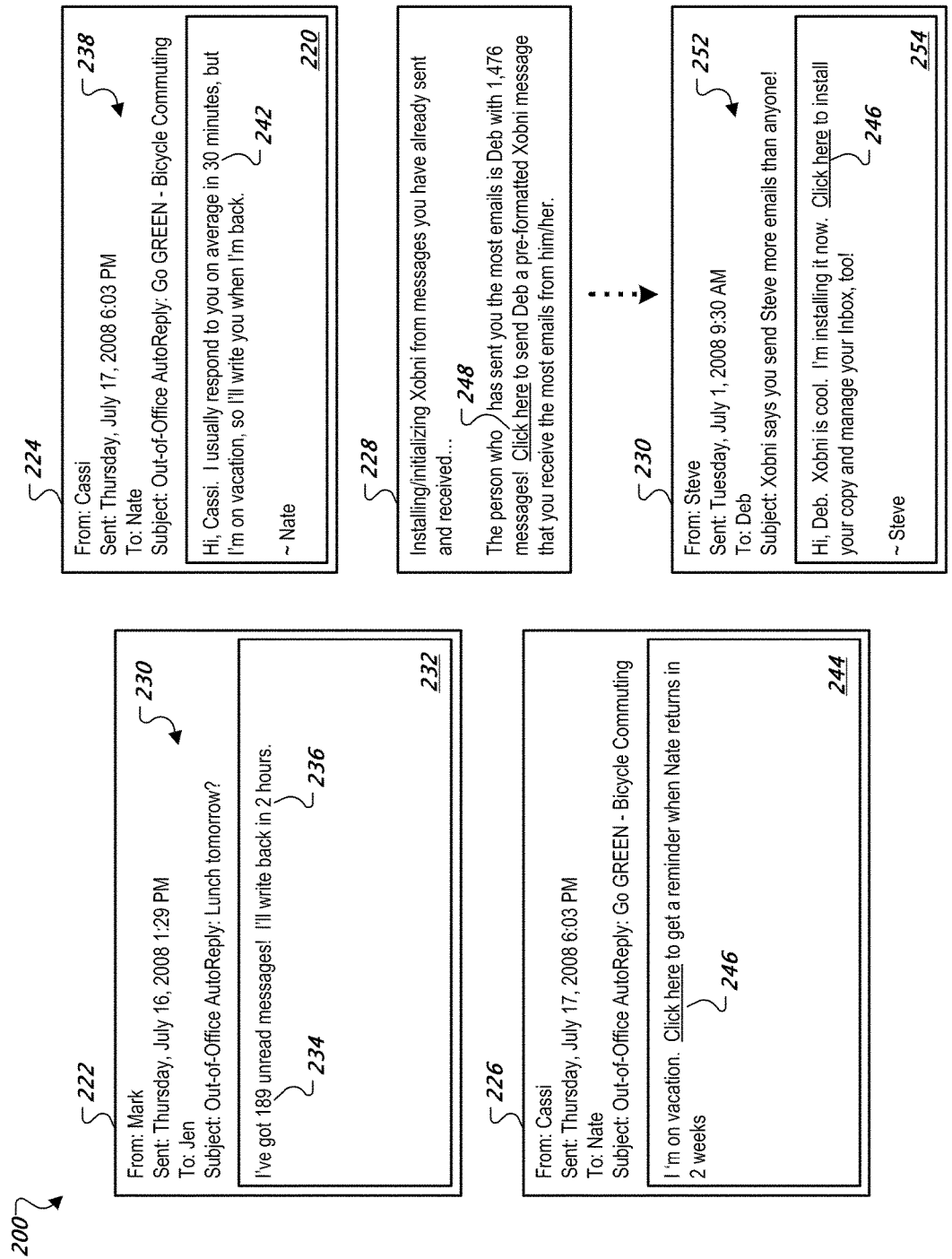
FIG. 2B shows example email- and person-specific auto-replies and signatures.

FIG. 2B shows example customized electronic communications 220. In the example, auto-replies and signatures 220 are shown in association with example email messages 222-228. The messages 222-228 can be sent, for example, to contacts such as any contact(s) in the contact network 152 described in reference to FIG. 3B. In some implementations, messages 222-228 or similar communications can be used in instant messaging, social network messaging and commenting, message board posting, text messaging, Voice Over Internet Protocol communications, and so on. The communication system 100 can automatically create messages such as the email messages 222-228 or other automatic communications using historical communication data, personal data, etc. For example, the messages 222-228 can be derived from information described in detail below in reference to FIGS. 3A-3C. In some implementations, the data used in generating messages 222-228 can further include email statistics, email status, user-specified setup parameters (e.g., email "rules," etc.), and the user's relationships with his contacts. Using email- and person-specific information and statistics can make the messages 222-228 unique and engaging.

In some implementations, the user can elect to send communications such as the messages 222-228 based on specific communications (e.g., email messages) that the user receives or specific persons (or users) that send the messages. For example, email-specific auto-replies can be based on the email's subject and/or message body, such as if "GREEN" appears in the subject or text body of the message. Person-specific messages 222-228 can be sent to individuals or groups of individuals that are defined in the user's communication system 100, such as individuals in the user's email contact list, instant messaging, social network messaging and commenting, message board posting, text messaging, Voice Over Internet Protocol communications.

For example, the message 222 can be an email auto-reply message generated in response to email recipient Jen who is away from her desk at a long meeting The message 222 can include a header 230, representing the original message regarding "Lunch tomorrow?" sent from Mark to Jen, and an automatically-generated auto-reply 232. For example, auto-reply 232 can state, "I've got 189 unread messages! I'll write back in 2 hours." In the example shown, a count 234 of 189 email messages can be automatically inserted into the message based on email usage statistics collected by the communication system 100. The user's return time 236 (e.g., "2 hours") can be calculated automatically from the user's (e.g., Jen's) expected return time and the current time-of-day. In some implementations, to elect to send the message 222, the user can input an expected return time 236 into the communication system (e.g., email "rules") and associate the return time to automatic auto-replies to one or more pre-defined contacts. For example, the user Jen may set up an email "rule" to provide a detailed message (e.g., the message 222) based on the sender, such as if the sender is either Mark or Sue. In some implementations, the auto-reply 232 can include the sender's name, such as by inserting "Mark" into the auto-reply 232 (e.g., "Sorry Mark, I've got 189 unread messages! I'll write back in 2 hours.").

In another example, the message 224 can be an email auto-reply message generated by Nate's email client in response to an email message sent from Cassi to Nate during his vacation The message 224 can include a header 238 and an automatically-generated auto-reply 240. The header 238 can represent the original message regarding "Go GREEN—Bicycle Commuting" sent from Cassi to Nate. For example, Nate's auto-reply 240 can state, "Hi, Cassi. I usually respond to you on average in 30 minutes, but I'm on vacation, so I'll write you when I'm back. ~Nate" In some implementations, an average response time statistic 242 of "30 minutes" can be automatically inserted into the auto-reply 240 by the communication system 100. For example, the response time statistic 242 can be derived from statistics collected over time by the communication system 100 based on Nate's past average response time to Cassi. In some implementations, the user Nate can define a "rule" or other parameter in his communication system to generate an auto-reply 240 to anyone who emails him while he is on vacation. In some implementations, the user Nate can further choose to automatically insert statistics such as the response time statistic 242 into his message.

In another example, the message 226 can be an email auto-reply message generated by Nate's email client in response to an email message sent from anyone during his vacation The message 226 can include an auto-reply 244 stating that Nate is "on vacation" that further includes recipient-selectable control, such as "Click here to get a reminder when Nate returns in 2 weeks." In the example shown, the auto-reply 244 can be predefined in Nate's email rules to automatically include a "Click here" link 246. For example, a recipient (e.g., Cassi) of Nate's message 226 can click on the "Click here" link 246. As a result, upon Nate's eventual scheduled return vacation, Cassi can automatically receive a communication, such as an email message that says "Nate is back from vacation".

In some implementations, the communication system 100 can remind users of certain email contact status. For example, if Cassi attempts to send Nate another message while he is on vacation, the communication system 100 can automatically send Cassi a reminder, such as, "Nate is still on vacation." In some implementations, the reminder can include an expected return date (e.g., "Nate is on vacation though August 1.")

In some implementations, the communication system 100 can generate communications containing statistics or "fun facts" (e.g., those contained in messages 222-228) when the communication system 100 is installed or initialized on the user's computer. For example, the system 100 can generate the message 228 containing, "Installing/initializing Xobni from messages you have already sent and received . . . . The person who has sent you the most emails is Deb with 1,476 messages! Click here to send Deb a pre-formatted Xobni fun fact that you receive the most emails from him/her." In some implementations, the message 228 can include a "Click here" link or other control 248 to automatically generate a message to the contact(s) associated with the statistics or "fun fact." If the user selects the control 248, a message 250 can be automatically generated by the system 100 and sent to the contact(s) (e.g., Deb). In the example shown, the message 250 can include a header 252 and a message body 254. The header 252 can identify the message subject as, "Xobni says you send Steve more emails than anyone!" The message body 254 can contain, "Hi, Deb. Xobni is cool. I'm installing it now. Click here to install your copy and manage your Inbox, too! ~Steve" In some implementations, the message body 254 can include a control 256 that the recipient can user to install the messaging system 100 application on the recipient's computer.

In some implementations, the system 100 can generate other messages based on communication systems 100 other than email systems. For example, a message similar to messages 222-228 that is based on the user's personal website can be "29 people have posted comments to your personal website so far, and 9 of them are email contacts." Another example message can be "3 people have completed the online survey on your website today." In another example, messages can be based on the user's social networking site(s). If, for example, the user is installing the communication system 100 on his computer, a message can be generated that says, "Click here to inform your 27 friends on FaceBook and 17 friends on MySpace that they can install Xobni to manage their inboxes too!"

Figure 3A:
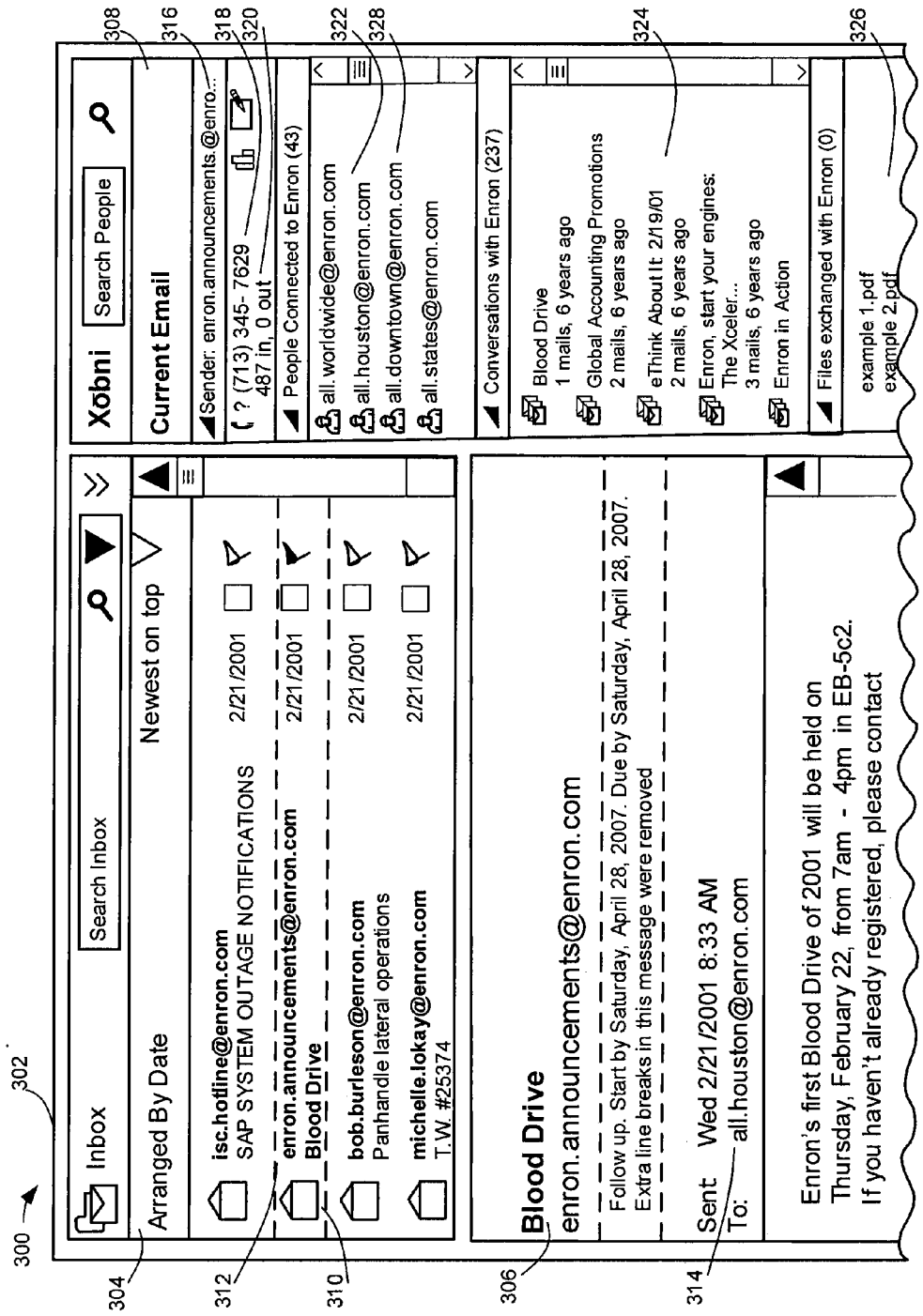
FIG. 3A shows an example e-mail client with a profile side bar.
Figure 3B:
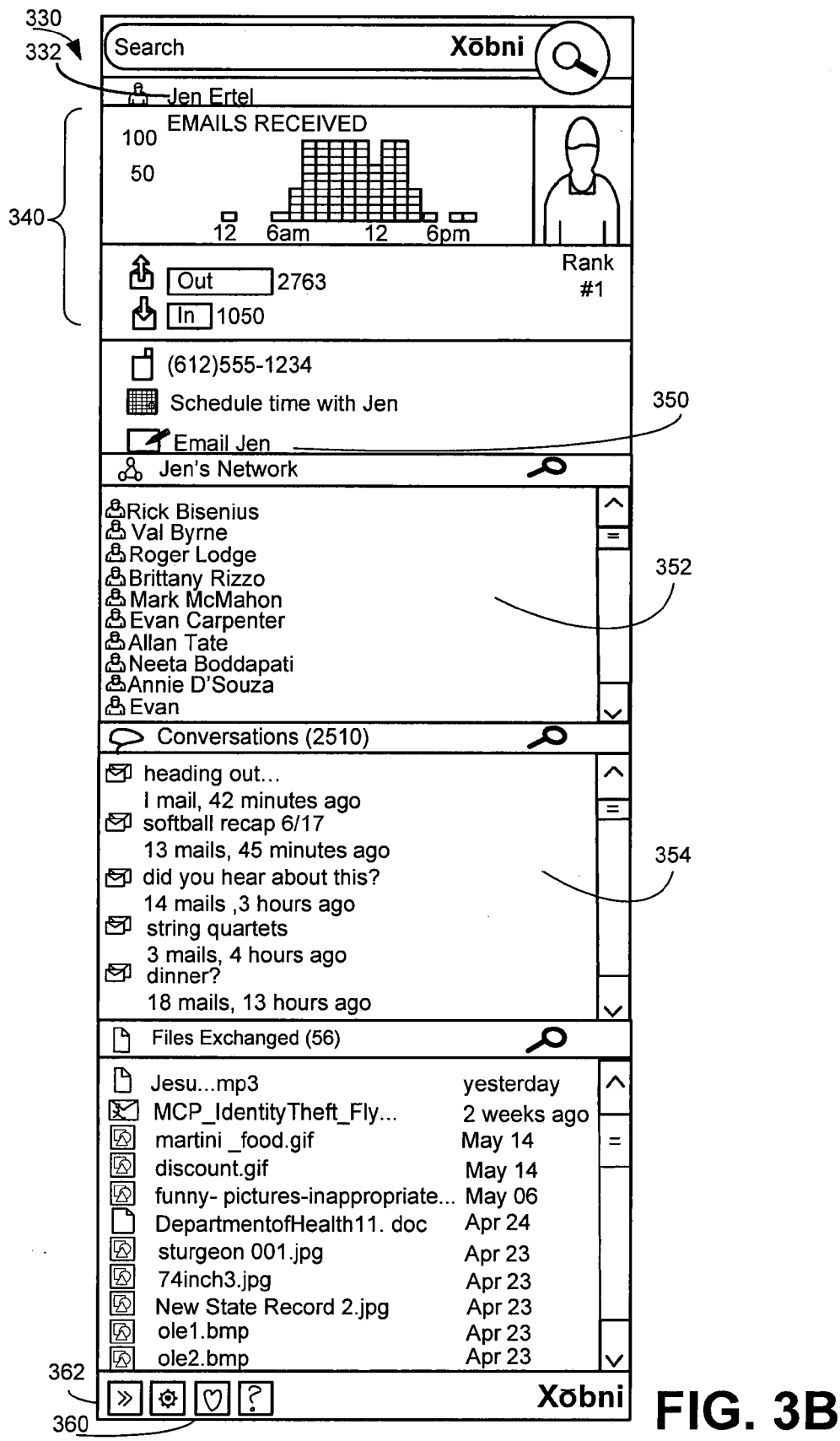
FIG. 3B shows an example of a profile.

FIG. 3A shows an example system 300 for presenting information in an electronic communications. The system 300 includes an e-mail client 302 which can include an inbox viewing panel 304 and an e-mail viewing panel 306. The e-mail client 302 can be a standard stand alone e-mail client such as Microsoft Outlook or Eudora. In an alternate implementation the e-mail client 302 can be a web based e-mail client such as Yahoo! mail or Gmail that is viewed using a web browser. The e-mail client 302 can allow a user to view a list of e-mails in the inbox viewing panel 304. The user can select an e-mail in the inbox viewing panel 304 causing the e-mail client 302 to display the selected e-mail in the e-mail viewing panel 306.

In some implementations, in stead of an e-mail client, the system 300 can include an instant messaging client, a social network client, a text message client, or another communication viewing client. It is to be understood that while portions of this description describe systems and methods involving e-mail communications, these same systems and methods can be implemented using other forms of communication, including instant messages, phone calls, text messages, internet message board postings, social network messages or comments, or voice over IP communications.

The e-mail client 302 also includes a profile 308. In the example depicted, the profile 308 is displayed as an additional panel within the e-mail client 302 positioned to the right of the inbox viewing panel 304 and the e-mail viewing panel 306. This additional panel is sometimes referred to as a side bar. In other implementations, the profile 308 can be located at the top, bottom, left side, or any other location within the e-mail client 302. In still other implementations, the profile 308 can be displayed in a stand alone window, in a pop-up bubble displayed over a portion of the e-mail client 302, or integrated as part of one of the other viewing panels displayed by the e-mail client 302. For example, a pop up bubble containing a profile 308 could appear when an e-mail is selected in the inbox viewing panel 304, when an e-mail address or portion of text in the e-mail viewing panel 306 is selected, or when a mouse icon is moved over an e-mail address, name, icon, or portion of text. In another example, information can be integrated as part of the body of an e-mail, such as inserting a picture next to a person's name in the body of an e-mail, or inserting a person's name next to a phone number in an e-mail or attachment.

The profile 308 can contain information relating to a sender of an e-mail, a recipient of an e-mail, the body of an e-mail, an attachment to an e-mail, or a person or topic mentioned in an e-mail. In alternate implementations, the profile 308 can contain information related to a sender, recipient, body, attachment or topic of another communication medium such as an instant message, a phone call, a text message, an internet message board, a social network message or comment, or a voice over IP communication. The user can implicitly request information to be displayed in the profile 308 by selecting an e-mail in the inbox viewing panel 304 or selecting text within a header or body of an e-mail in the e-mail viewing panel 306. In some implementations, the profile can include additional information (e.g., derived information such as search results derived from a topic mentioned in a communication).

In some implementations, the profile 308 can display information about an entity other than a person. For example, a communication may be received from an automated system, such as from a travel website, on-line retailer, an advertising service, or a mailing list. The profile 308 can display information related to the sender of the communication. For example, if the communication received has been sent from a travel website, information related to the travel website, or other communications from the travel website can be displayed. In another example, if the communication received has been sent from an mailing list, information related to the mailing list, or other communications received from the mailing list can be displayed. As yet another example, if the communication received has been sent from a business entity, information about the business entity (e.g., address, telephone number, contact person name) can be included in the profile.

For example, the user can select an e-mail 310 in the inbox viewing panel 304 causing the profile 308 to display information related to a sender 312 of the e-mail 310. In another example, the user can select an e-mail address 314 or name of a recipient of the e-mail 310 in order to display information related to the recipient in the profile 308. In another example, the user can select an attachment to the e-mail 310 in order to display information related to the attachment in the profile 308. In yet another example, the user can select the name of a person, a user name of a person, or a particular topic listed in a header, a body, or an attachment of the e-mail 310 in order to display information related to the person or topic in the profile 308.

In some implementations, the system 300 can determine if the user has made an implicit request to view information in the profile 308 by tracking, for example, user input of the form of mouse movements, mouse locations, keyboard strokes, mouse clicks, or active windows. Implicit requests to view information in the profile 308 can include opening, viewing, reading or writing an e-mail or other communication medium. For example, if the user starts to compose an instant message, the profile 308 can display information related to the recipient of the instant message. In another example, if the user views a social network profile, either within the e-mail client 302 or in a separate web browser, the profile 308 can display information related to a person associated with the social network profile.

In some implementations, the user can make a specific request to view information in the profile 308 by performing a search or clicking on a person's name.

In some implementations, the system 300 can be linked to a phone (e.g., voice over IP phone) used by the user. For example, the system 300 can include means for detecting when the user makes or receives a phone call or text message using the phone and display information related to a recipient or initiator of the phone call or text message in the profile 308.

In the example depicted in FIG. 3A, the user has selected the e-mail 310 in the inbox viewing panel 304 and header information and a portion of the body of the e-mail 310 is displayed in the e-mail viewing panel 306. The e-mail 310 was received from the sender 312. The system 300 has determined that the user has made an implicit request to view information related to the sender 312 by selecting the e-mail 310. In response to this implicit request, the system 300 displays in the profile 308 information related to the sender 312.

In the example, the information displayed in the profile 308 includes an e-mail address 316, a phone number 318, communication statistics 320 (also known as usage statistics), a contact network 322, a conversation list 324, and a files exchanged list 326. In some implementations, the profile 308 can display additional contact information such as name, screen names, social network profile names, social network profile URLs, physical addresses, website URLs, additional e-mail addresses, or additional telephone numbers.

In some implementations, the profile 308 can include additional information. The system 300 can extract information from the e-mail 310 and use this information to gather and display data from websites, search engines, or other sources of information.

In some implementations, communication statistics 340 can be shared with other persons. For example, the user can choose to share communication statistics with the person 332, such as described above in reference to FIGS. 2A and 2B. The person 332 will then be able to view communication statistics 340 about his or her communications with the user. In some implementations, the user can indicate that one or more persons are trusted contacts. Communication statistics 340 can be automatically shared with all persons indicated as trusted contacts. Other information, such as calendar information, contact information, or contact network information can also be shared with trusted contacts.

The profile 330 can also include one or more initiate communication links 350. In the example shown in FIG. 3B, the initiate communication link 350 displayed will cause an e-mail addressed to the person 332 to be automatically generated when it is clicked on. Other forms of communication that can be initiated using an initiate communication link 350 include telephone calls, instant messages, text messages, social network messages, social network posts, message board posts, facsimiles, or voice over IP communications. For example, the profile 330 can include a "call Jen" link that can cause the user's cell phone to dial Jen's phone number when clicked on. In another example, the profile 330 can include an "instant message" link that when clicked on, can cause an instant message program to automatically open and generate an instant message addressed to a screen name of the person 332.

The profile 330 can include one or more menu buttons 360. The menu buttons can be used to change personal settings or preferences, change viewing preferences, or access menus or help information. The profile 330 can also include a minimize button 362 that can cause the profile 330 to minimize or close. When the minimize button 362 is clicked or selected, a minimized version of the profile 330 that takes up less space in a viewing window can be displayed. The minimized version of the profile 330 can include a summary of some or all of the information displayed by the profile 330.

Figure 3C:
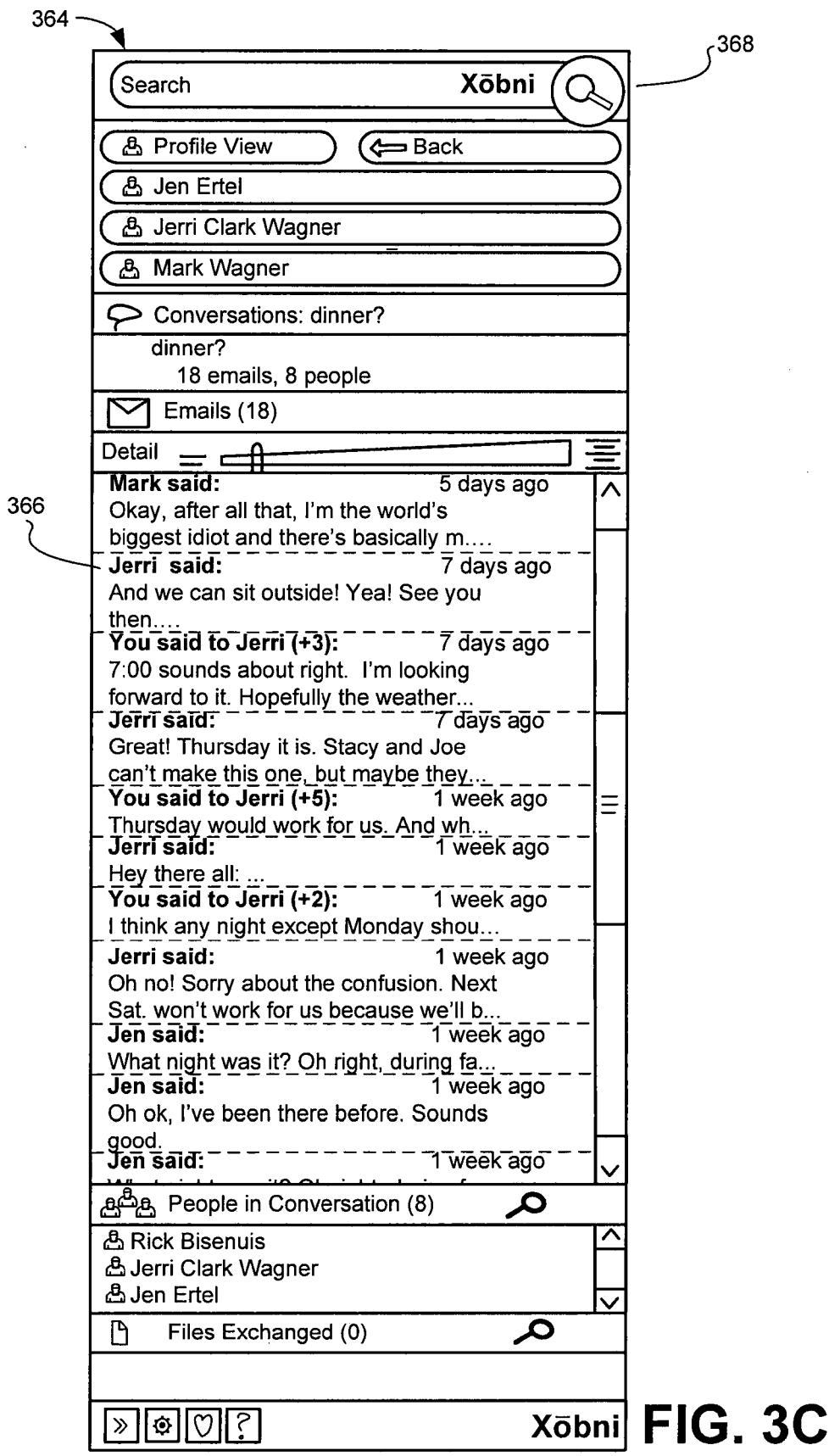
FIG. 3C shows an example of a conversation thread profile.

FIG. 3C shows a viewing panel 364. The viewing panel 364 can display a profile such as the profile 330 of FIG. 3B. The viewing panel 364 can also display information about communications, communication attachments, files, or conversation threads. In the example shown in FIG. 3C the viewing panel 364 displays information about a conversation thread 366. The information about the conversation thread 366 can be displayed in response to a user clicking on a conversation thread 366 in a conversation list, such as the conversation list 354 from FIG. 3B. The conversation thread 366 can also be displayed in response to the user viewing, reading, selecting, opening, or writing a communication that is part of the currently displayed conversation thread 366. In some implementations, the conversation thread 366 can be displayed in response to a search performed by the user. For example, the user can use a search bar 368 to search for a conversation thread 366 based on the subject of the conversation thread 366, participants in the conversation thread 366, files attached to communications in the conversation thread 366, or key words or terms in the communications of the conversation thread 366.

Figure 4:
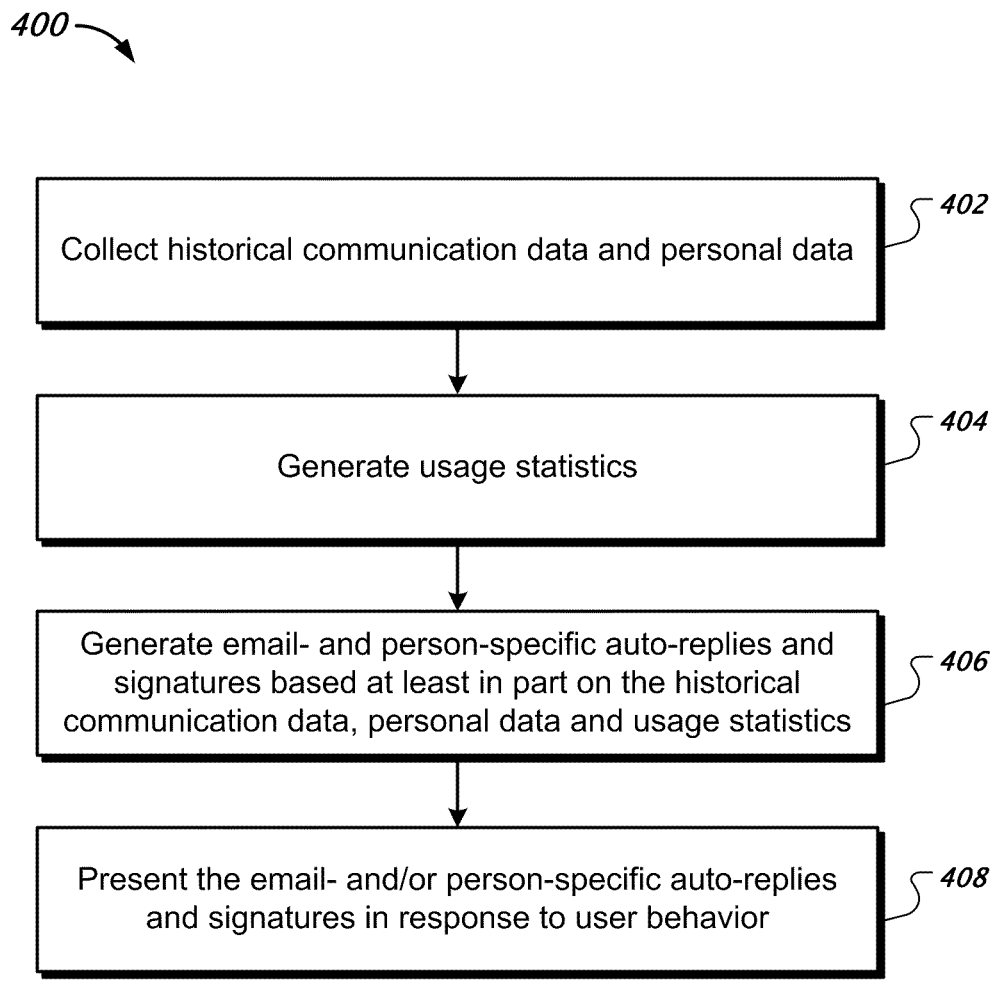
FIG. 4 is a flow diagram of an example process for presenting information in an electronic communication.

FIG. 4 is a flow diagram of an example process 400 for customizing information included in a electronic communication. The process 400 can, for example, be implemented in a system such as the system 100 of FIG. 1. In another example, the process 400 can be implemented in a system such as the communication delivery system 300 of FIG. 3.

Stage 402 collects historical communication data and personal data. For example, communications such as e-mails, instant messages, phone calls, text messages, internet message board postings, social network messages or comments, or voice over IP communications can be collected. Historical communication data and personal data can also be collected from web search engines, people search engines, social networks, e-mail clients, personal web pages, telephone directories, scanned business card data, picture sharing websites, video sharing websites, profile pages, travel websites, on-line retailers, or customer relationship management systems.

The collected historical communication data and personal data can include contact information, biographical information, communication text, communication summaries, physical location information, mapping information, attachments to communications, weather information, travel information, and retail information.

Stage 404 deposits the collected data into a repository. For example, the collected data can be stored in a database on a user's computer. The collected data can also be stored on a network server, a web server, a removable storage device, or as part of an e-mail client or other communication client.

Stage 406 generates an electronic communication that includes customized content (e.g., email- and person-specific auto-replies and signatures) based at least in part on the historical communication data, personal data and usage statistics. For example, referring to FIGS. 2A and 2B, a system implementing the method 400 can generate email- and person-specific auto-replies and signatures such as messages 222-228 using historical communication data, personal data and usage statistics. In some implementations, the instructions and definitions used to automatically generate and distribute the messages can be set up in "rules" or other parameters in the user's email system. In some implementations, the user can elect to send messages such as message 228 to contacts associated with certain facts (e.g., the contact sending the user the most email messages). In some implementations, the user can elect to send messages to specific users or messages related to certain subjects, or to include in the messages email- and/or person-specific information. In some implementations, the user can elect to send messages while installing a communication system 100 application.

Stage 408 presents customized information (e.g., the email- and/or person-specific auto-replies and signatures) in response to user behavior. For example, referring to FIG. 2B, the messages 222-226 can be automatically generated based on rules or other communication system parameters set up by the user. The messages 222-226 can further include specific email-specific and person-specific information, such as the number of emails received from a contact, the number of un-read email messages in a user's inbox, the time until the user is expected to return from vacation, and so on. Referring to FIGS. 1 and 2B, the messages 222-228 can be sent over any computer network 106, such as the Internet, an intranet, a LAN system or a company's internal computer network. In some implementations, the computer 102 and the computer 104 can be desktop computers, laptop computers, cell phones, web enabled televisions, or personal digital assistants. The communication transmitted from the computer 102 to the computer 104 can be an e-mail, phone call, instant message, text message, social network message or comment, message board post, or voice over IP communication. The messages 222-228 can be viewed by the recipient, for example, when the recipient elects to read a message in his or her inbox.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed:

1. A method, comprising:
    collecting historical communication data relating to senders of a plurality of communications to a user;
    depositing the collected data into a repository, the repository comprising a plurality of profiles, each profile for a respective one of the senders, the profiles including a first profile for a first sender;
    extracting data from a first communication from the first sender to the user;
    searching, over a network, using the extracted data to obtain a search result about the first sender;
    updating the first profile using the search result;
    in response to receiving a second communication from the first sender to the user, generating, via a computing device, customized content for inclusion in a body of a reply communication to the first sender, wherein the customized content is customized for the first sender based on the historical communication data for prior communications with the first sender, and the customized content includes information from the first profile and a statistic regarding the prior communications with the first sender that is integrated into text for an auto-reply in the body of the reply communication;
    inserting the customized content into the body of the reply communication, the reply communication including the auto-reply; and
    automatically sending the reply communication to the first sender.

2. The method of claim 1, wherein the searching further comprises querying one or more sources of information to obtain the search result.

3. The method of claim 2, wherein the sources are selected from the group consisting of web search engines, people search engines, social networks, picture sharing websites, video sharing websites, and customer relationship management systems.

4. The method of claim 1, wherein the searching further comprises requesting information from one of the senders.

5. The method of claim 1, further comprising displaying auto replies in an additional panel within an e-mail client, web browser, or instant message window.

6. The method of claim 5, wherein the panel is a sidebar.

7. The method of claim 1, further comprising displaying the auto-reply in a pop-up window.

8. The method of claim 1, wherein the auto-reply is integrated with the body of the reply communication using one or more display methods selected from the group consisting of highlighting, underlining, and adding hyper links.

9. The method of claim 1, wherein the historical communication data includes information selected from the group consisting of times of communications, lengths of communications, subject matters of communications, titles of communications, participants in communications, sources of communications, response times of communications, types of communications, and volume of communications.

10. The method of claim 1, further comprising sharing some or all of the customized content among a network of participants.

11. The method of claim 10, wherein the sharing further comprises sharing different amounts of data with each participant based on preference settings.

12. The method of claim 1, wherein the customized content includes one or more items, the method further comprising allowing the user to select one or more of the items prior to the sending of the reply communication.

13. A non-transitory computer-readable storage medium storing thereon computer readable instructions, the instructions for causing a computing device to:
  collect historical communication data relating to senders of a plurality of communications to a user;
  deposit the collected data into a repository, the repository comprising a plurality of profiles, each profile for a respective one of the senders, the profiles including a first profile for a first sender;
  extract data from a first communication from the first sender to the user;
  search, over a network, using the extracted data to obtain a search result about the first sender;
  update the first profile using the search result;
  in response to receiving a second communication from the first sender to the user, generate customized content for inclusion in a body of a reply communication to the first sender, wherein the customized content is customized for the first sender based on the historical communication data for prior communications with the first sender, and the customized content includes information from the first profile and a statistic regarding the prior communications with the first sender that is integrated into text for an auto-reply in the body of the reply communication;
  insert the customized content into the body of the reply communication, the reply communication including the auto-reply; and
  automatically send the reply communication to the first sender.

14. A system, comprising:
a processor; and
memory storing instructions configured to instruct the processor to:
  collect historical communication data relating to senders of a plurality of communications to a user;
  deposit the collected data into a repository, the repository comprising a plurality of profiles, each profile for a respective one of the senders, the profiles including a first profile for a first sender;
  extract data from a first communication from the first sender to the user;
  search, over a network, using the extracted data to obtain a search result about the first sender;
  update the first profile using the search result;
  in response to receiving a second communication from the first sender to the user, generate customized content for inclusion in a body of a reply communication to the first sender, wherein the customized content is customized for the first sender based on the historical communication data for prior communications with the first sender, and the customized content includes information from the first profile and a statistic regarding the prior communications with the first sender that is integrated into text for an auto-reply in the body of the reply communication;
  insert the customized content into the body of the reply electronic communication, the reply communication including the auto-reply; and
  automatically send the reply communication to the first sender.

* * * * *